United States Patent
Saito et al.

(10) Patent No.: US 8,390,936 B2
(45) Date of Patent: Mar. 5, 2013

(54) ZOOM LENS AND IMAGE PICKUP APPARATUS HAVING THE ZOOM LENS

(75) Inventors: Shinichiro Saito, Utsunomiya (JP); Nobuyuki Miyazawa, Utsunomiya (JP); Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 13/086,153

(22) Filed: Apr. 13, 2011

(65) Prior Publication Data

US 2011/0254994 A1    Oct. 20, 2011

(30) Foreign Application Priority Data

Apr. 19, 2010 (JP) ................................. 2010-095808

(51) Int. Cl.
*G02B 15/14* (2006.01)
*H04N 5/225* (2006.01)
(52) U.S. Cl. .................... 359/686; 359/684; 348/340
(58) Field of Classification Search .................. 348/335, 348/340, E5.024; 359/683, 684, 686, 687
See application file for complete search history.

(56) References Cited

U.S. PATENT DOCUMENTS

| | | | |
|---|---|---|---|
| 6,594,087 B2 | 7/2003 | Uzawa et al. | |
| 6,931,207 B2 * | 8/2005 | Nanba | 396/72 |
| 7,304,805 B2 | 12/2007 | Endo et al. | |
| 8,134,783 B2 * | 3/2012 | Saito et al. | 359/684 |

FOREIGN PATENT DOCUMENTS

JP    2006-113453 A    4/2006

* cited by examiner

*Primary Examiner* — David N Spector
(74) *Attorney, Agent, or Firm* — Canon U.S.A., Inc. IP Division

(57) ABSTRACT

A zoom lens includes, in order from an object side to an image side, a first lens unit having a positive refractive power, a second lens unit having a negative refractive power, a third lens unit having a positive refractive power, and a rear lens unit including one or more lens units. An interval between respective adjacent lens units varies during zooming such that an interval between the first lens unit and the second lens unit is larger at a telephoto end than at a wide-angle end and an interval between the second lens unit and the third lens unit is smaller at the telephoto end than at the wide-angle end. The third lens unit includes at least one negative lens. An Abbe number (vd3$n$) and a relative partial dispersion (θgF3$n$) of a material of the negative lens are appropriately set based on predetermined conditional expressions.

12 Claims, 19 Drawing Sheets

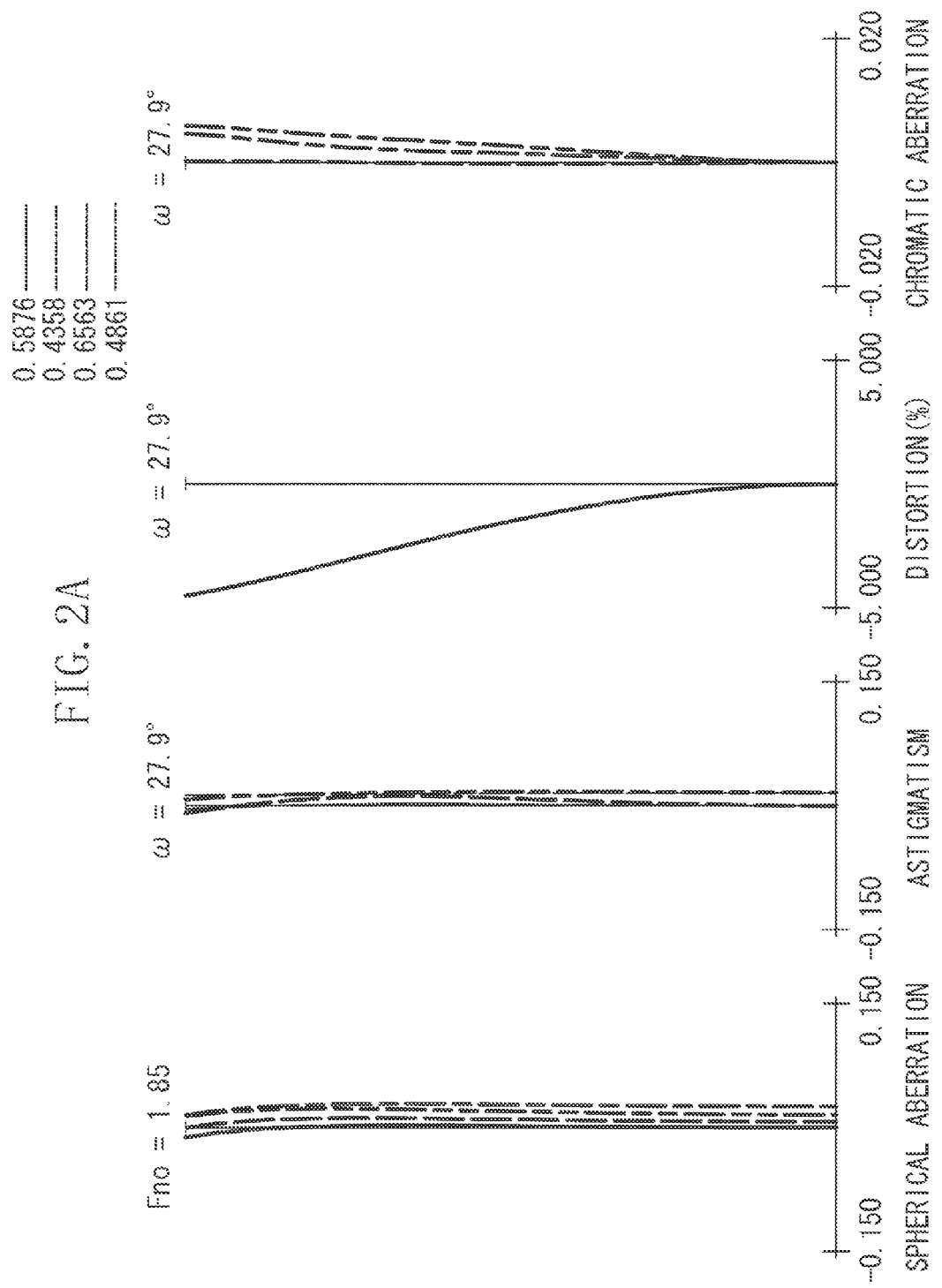

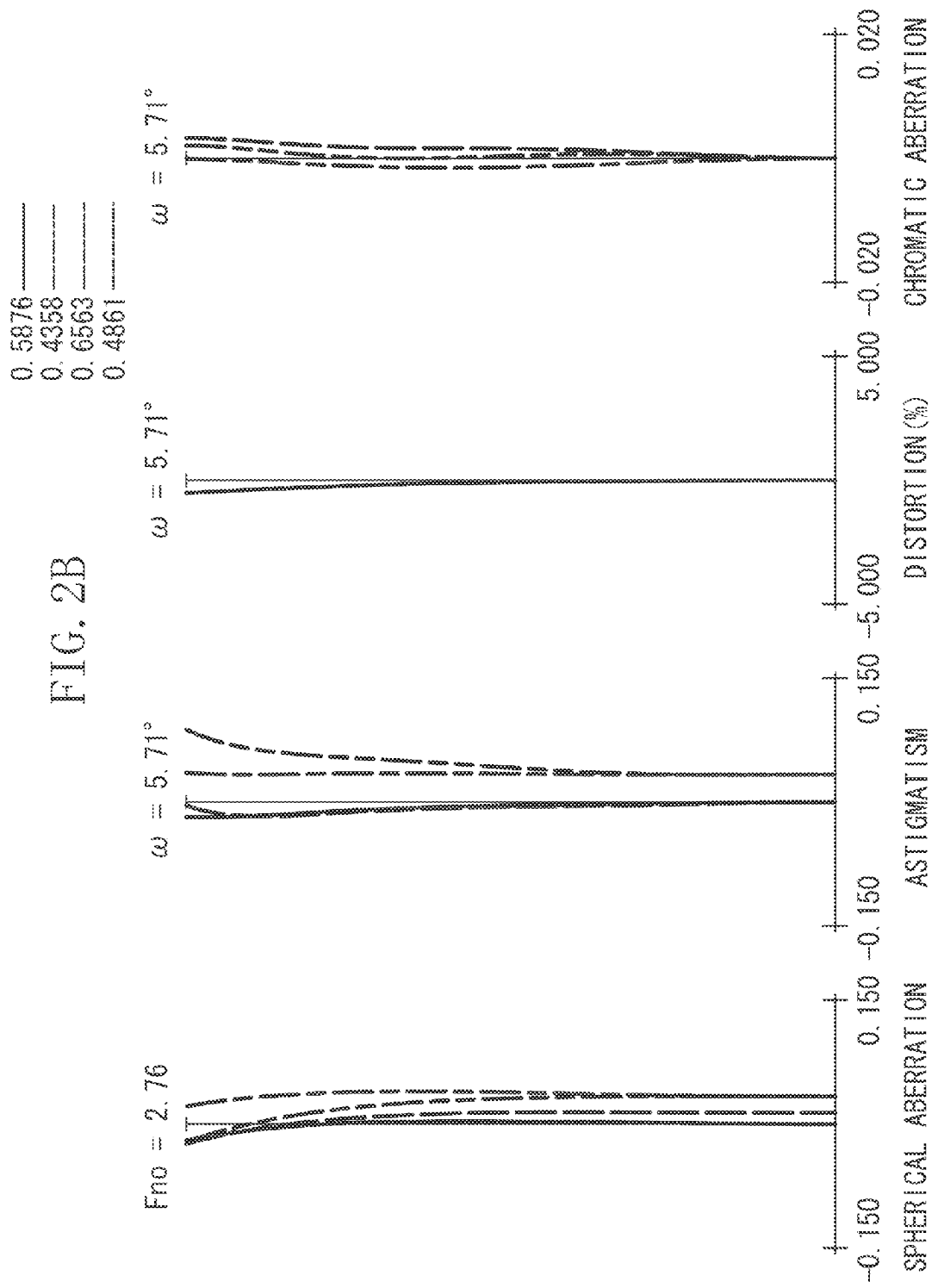

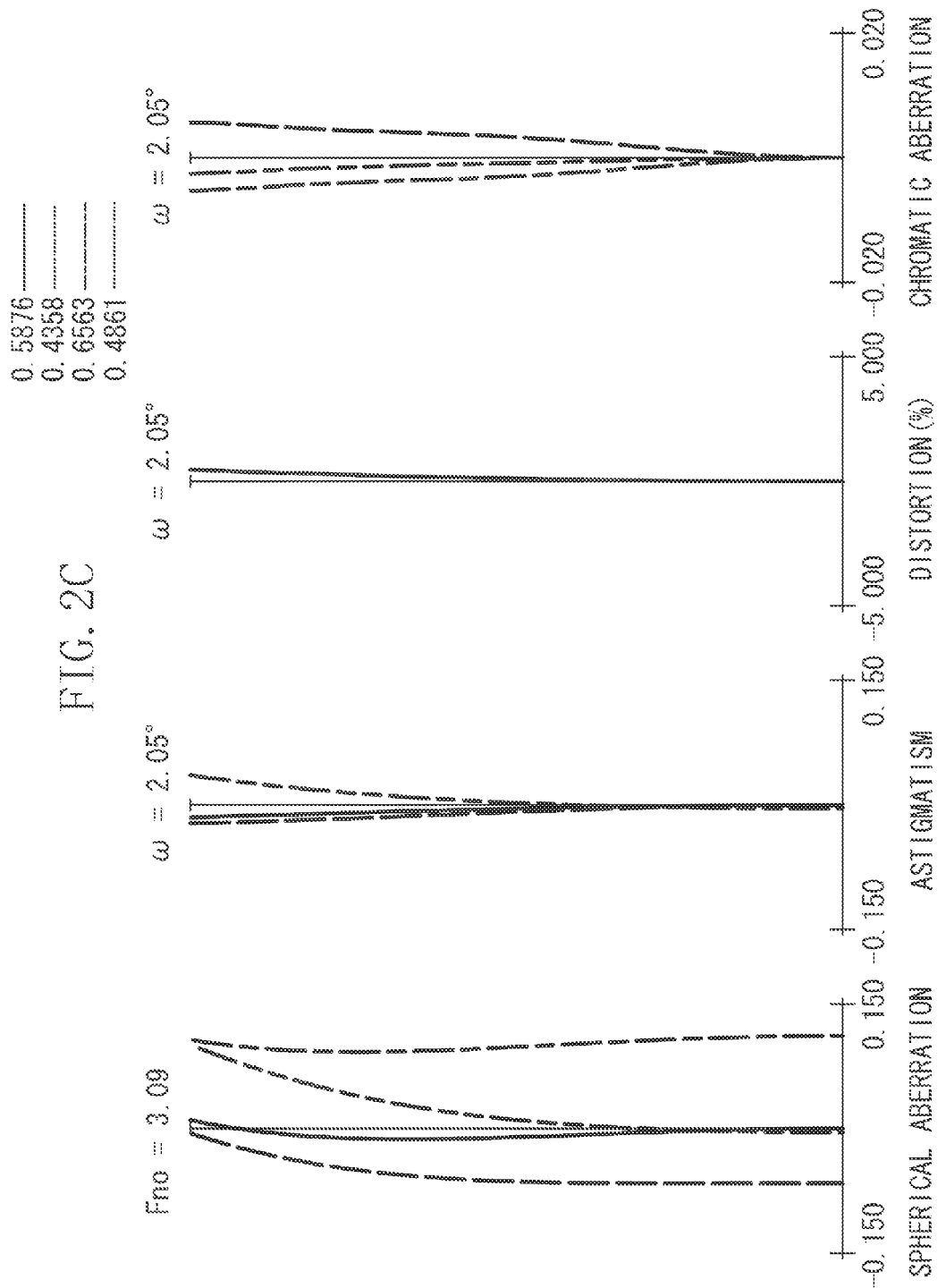

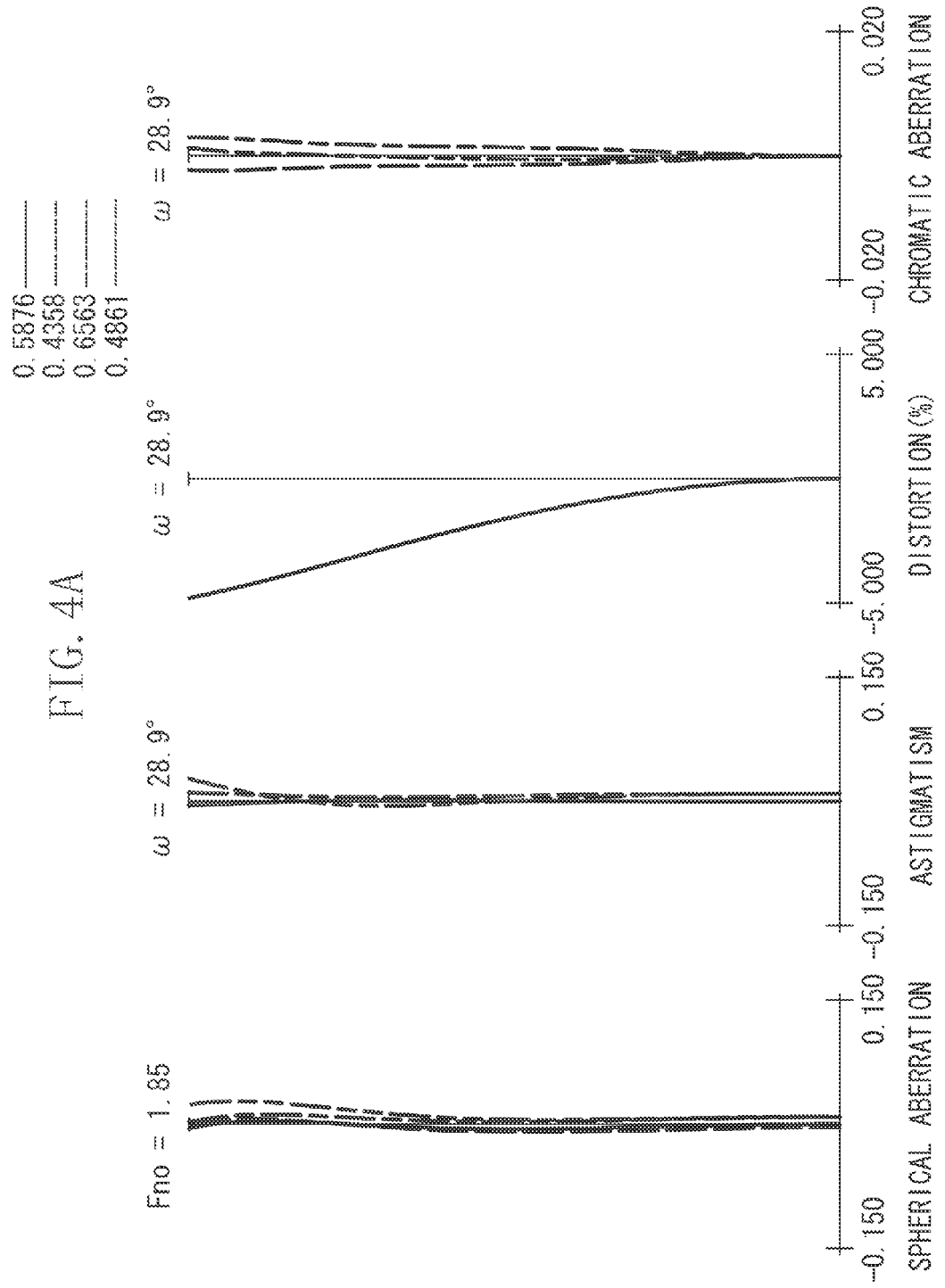

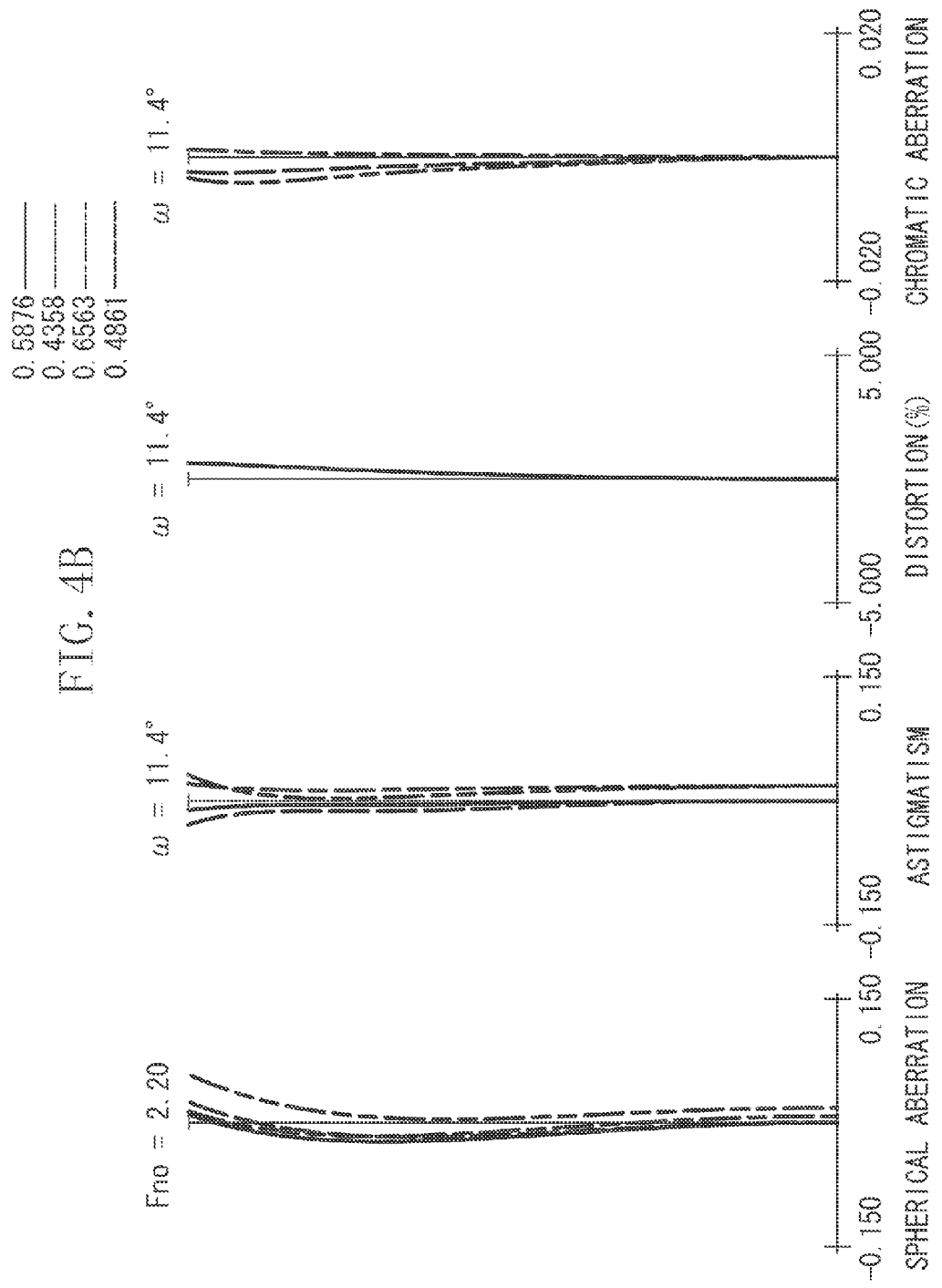

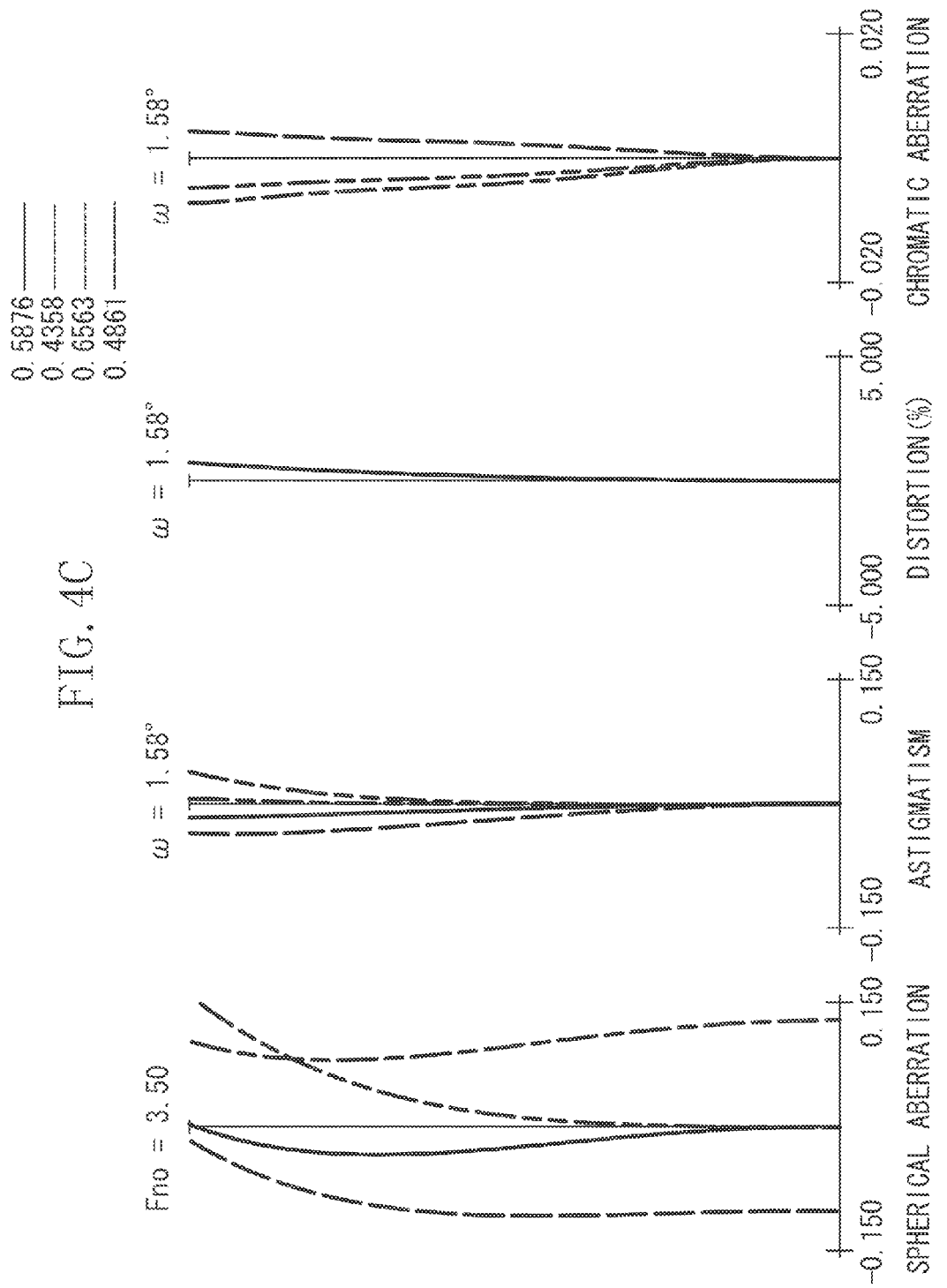

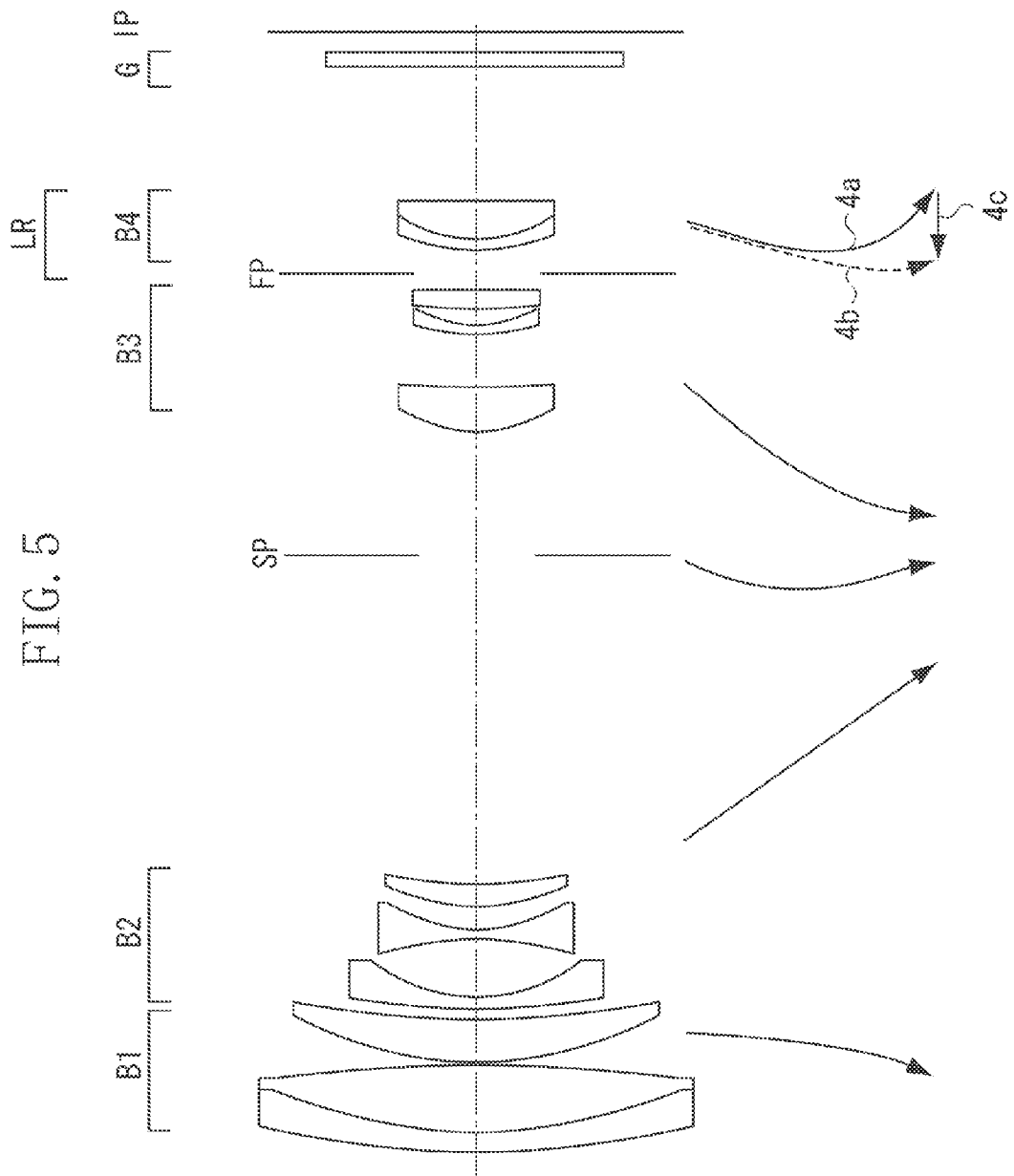

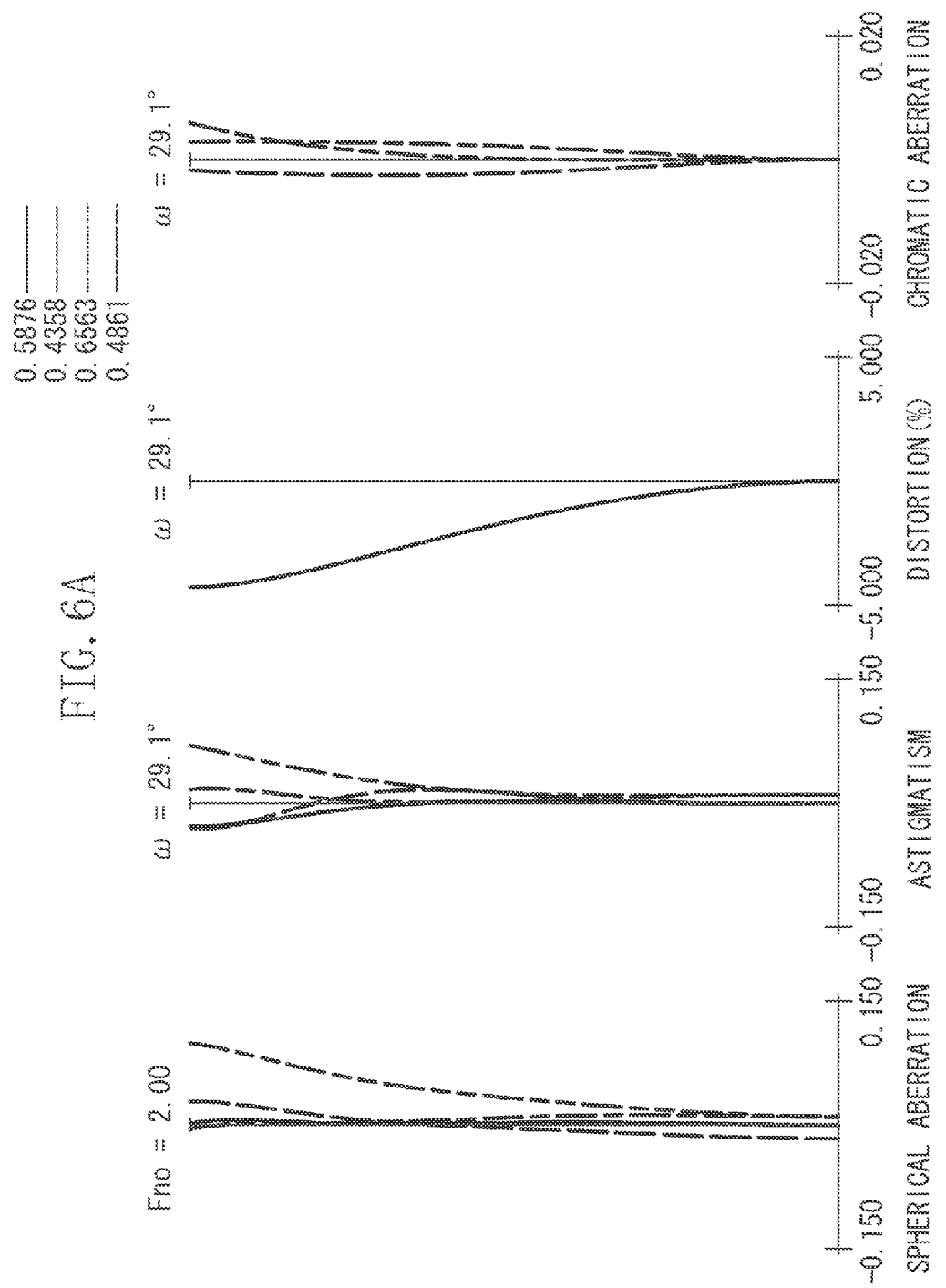

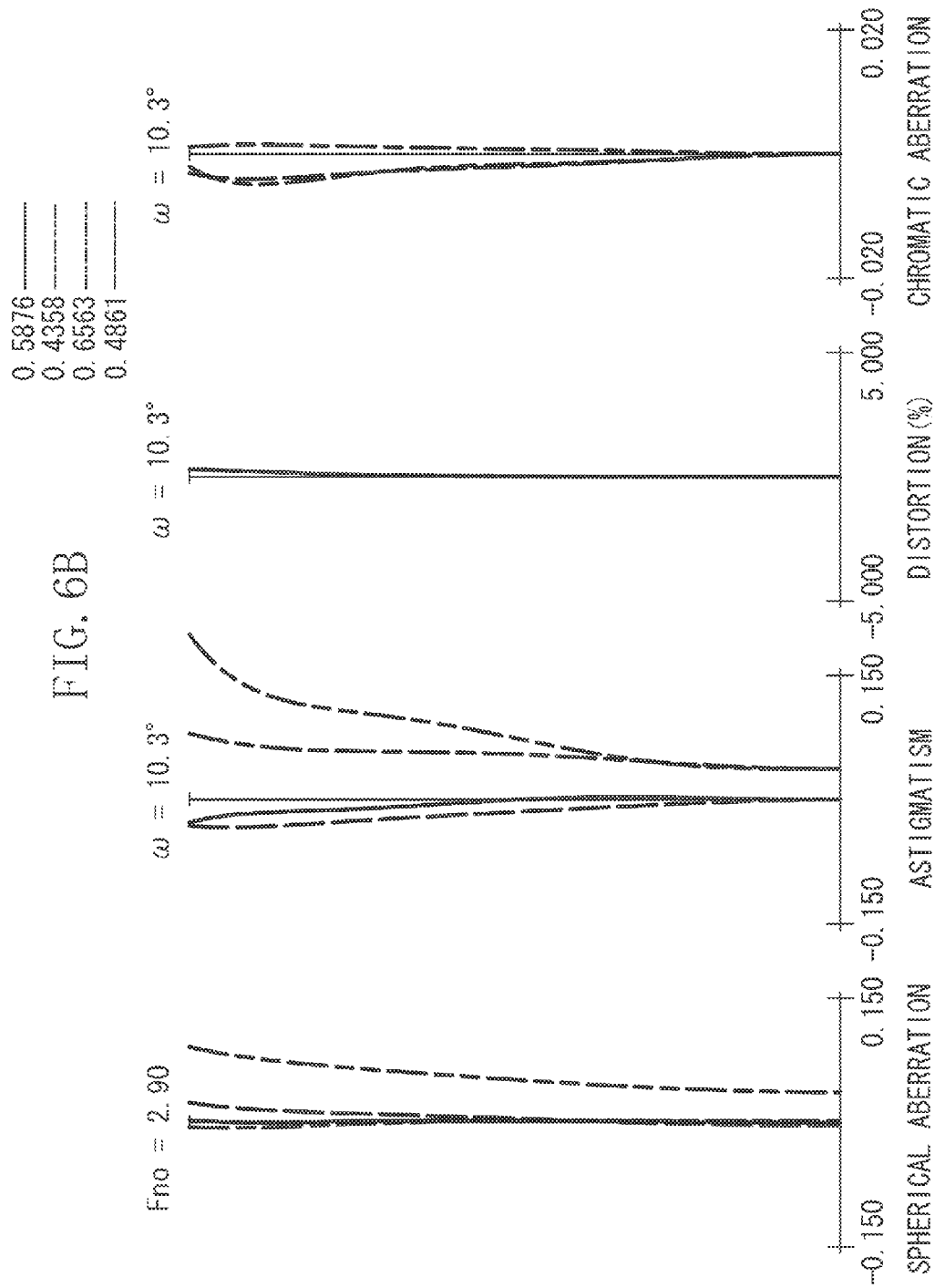

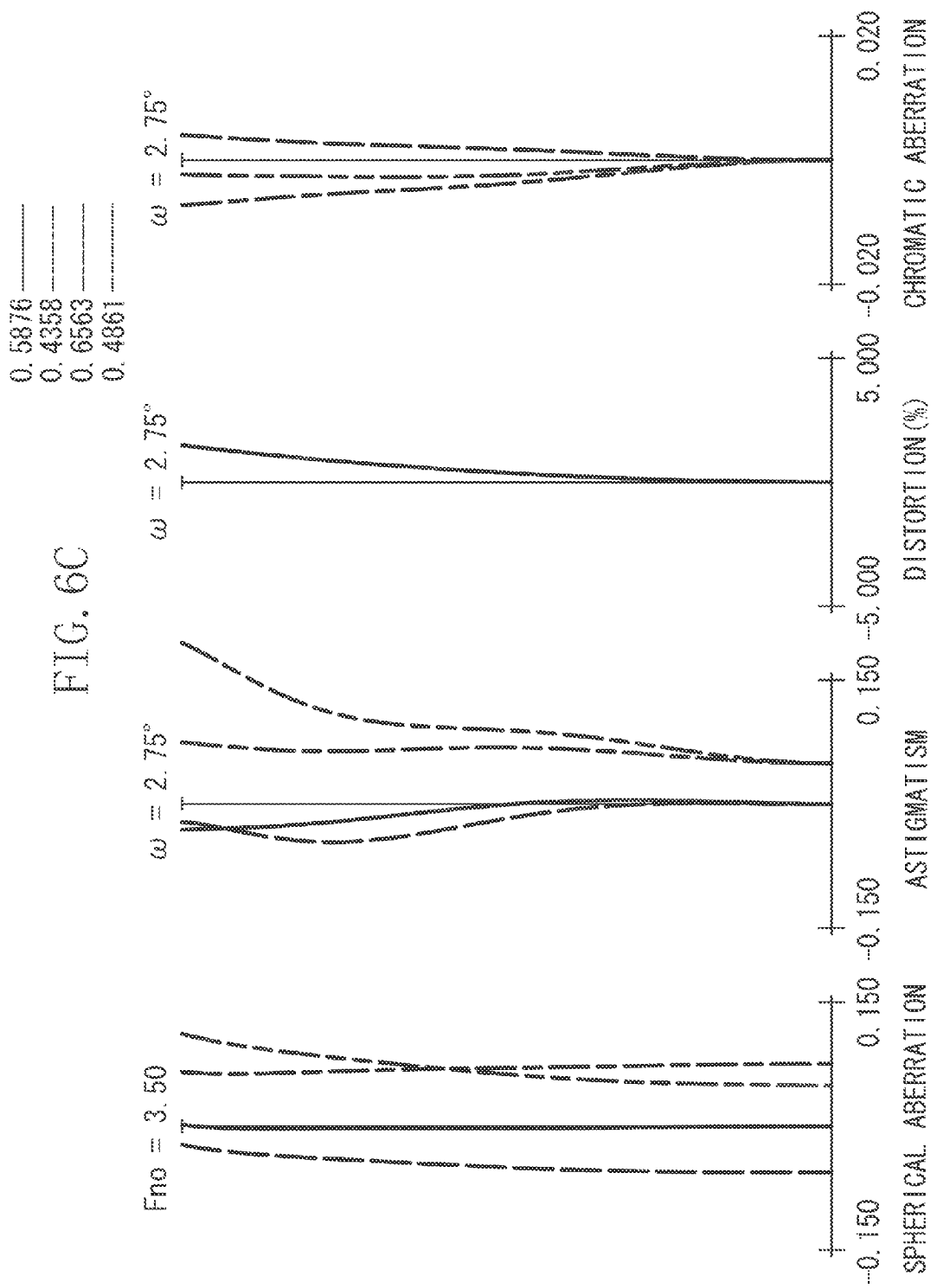

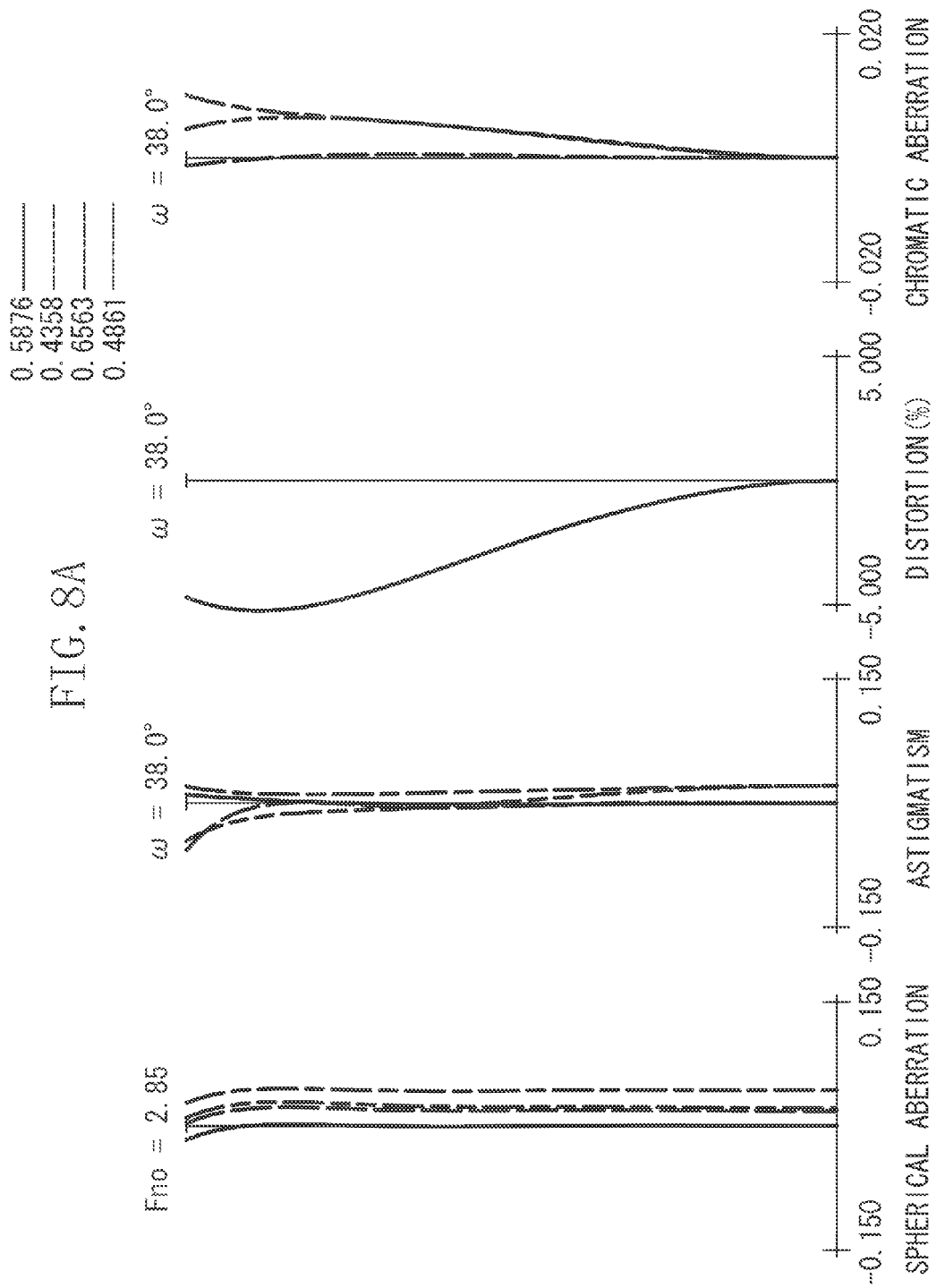

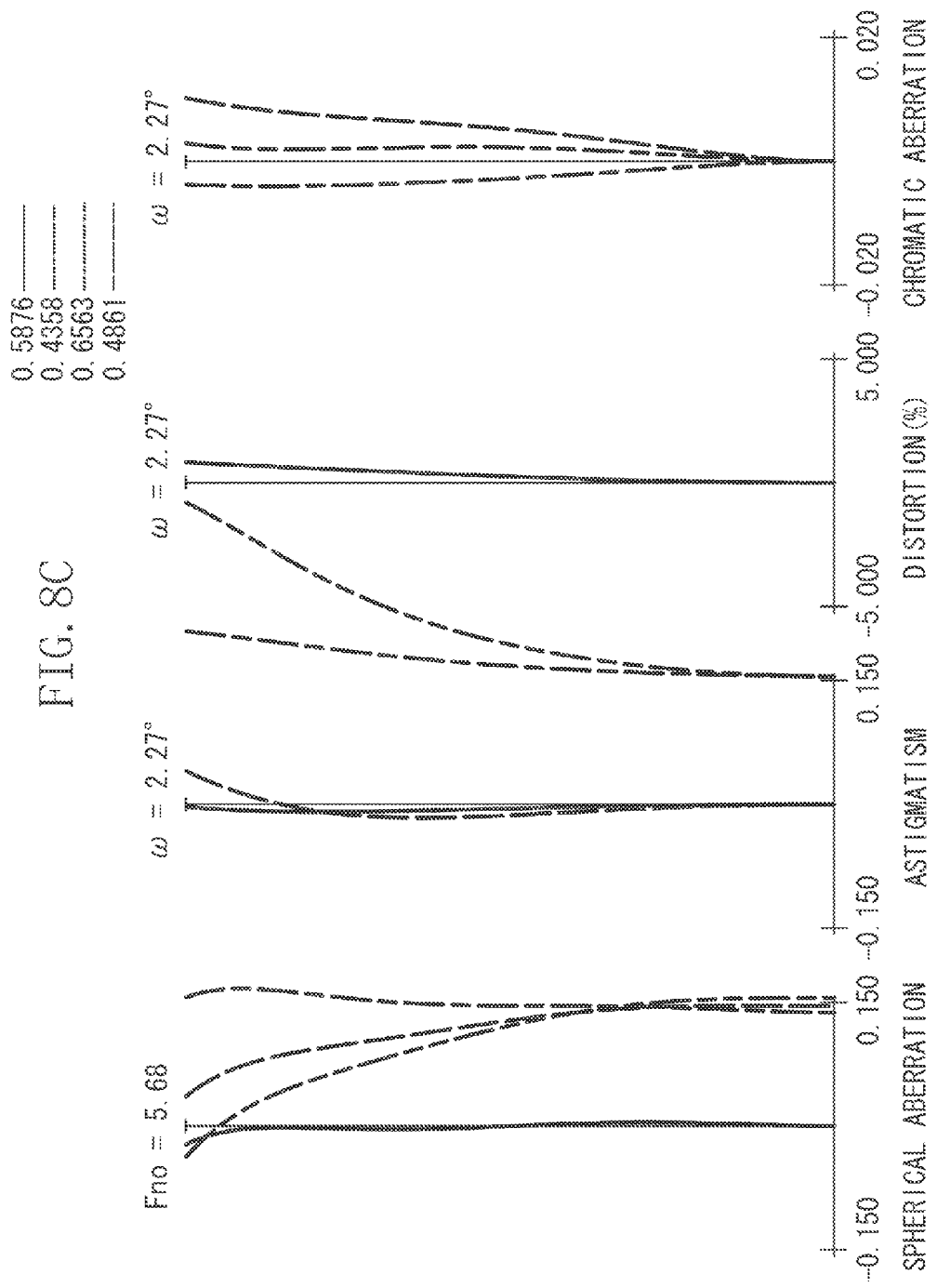

ZOOM LENS AND IMAGE PICKUP APPARATUS HAVING THE ZOOM LENS

BACKGROUND OF THE INVENTION

1. Field of the Invention

The present invention relates to a zoom lens and an image pickup apparatus on which the zoom lens can be used. More specifically, the present invention relates to a zoom lens useful as a photographic optical system of an image pickup apparatus, such as a digital still camera, a video camera, a television (TV) camera, a monitoring camera, or a silver-halide film camera.

2. Description of the Related Art

In recent years, the number of pixels per unit area in image sensors used in image pickup apparatuses, such as a digital cameras or a video cameras, has continuously increased. In order to best take advantage of these highly advanced image sensors, it is desirable that a photographic lens used in the image pickup apparatus be capable of appropriately correcting chromatic aberration as well as monochromatic (single-wavelength) aberration, such as spherical aberration or coma. In addition, it is desirable that a photographic lens used in the image pickup apparatus like this is small-sized and has a high zoom ratio. Furthermore, it is desired that a zoom lens having a high zoom ratio, whose focal length at the telephoto end is long, is capable of appropriately executing primary achromatism and also of appropriately correcting secondary spectrum.

To meet the foregoing requirements, a positive-lead type zoom lens having a high zoom ratio, which includes a lens unit having a positive refractive power at a location closest to the object side, has been used. U.S. Pat. No. 6,594,087 discusses a positive-lead type zoom lens that uses a low and anomalous dispersion material for a lens included in the first lens unit and which is capable of appropriately correcting chromatic aberration.

Japanese Patent Application Laid-Open No. 2006-113453 discusses a four-unit zoom lens including, in order from the object side to the image side, a first lens unit having a positive refractive power, a second lens unit having a negative refractive power, a third lens unit having a positive refractive power, and a fourth lens unit having a positive refractive power. The zoom lens discussed in Japanese Patent Application Laid-Open No. 2006-113453 uses a lens made of a low dispersion material having anomalous dispersion for the third lens unit.

In addition, U.S. Pat. No. 7,304,805 discusses a five-unit zoom lens including, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power. The zoom lens discussed in U.S. Pat. No. 7,304,805 uses a lens having anomalous dispersion for the first lens unit.

For a positive-lead type zoom lens, it is relatively easy to reduce the size of the entire zoom lens and to achieve a high zoom ratio at the same time. However, if the zoom ratio of a positive-lead type zoom lens is merely increased, then a large amount of secondary spectrum of axial chromatic aberration occurs in the zoom area at the telephoto end.

In order to reduce chromatic aberration, it is effective to use a lens made of a low dispersion material having anomalous dispersion at an appropriate location inside the zoom lens. In order to appropriately correct chromatic aberration, it is significant to optimally set the refractive power of each lens unit included in the zoom lens based on a characteristic of the lens material (the Abbe number, the relative partial dispersion, or the like).

In particular, in the above-described positive-lead type zoom lens including five or four lens units, unless characteristics of a material constituting a lens included in the third lens unit having a positive refractive power are appropriately set, it becomes difficult to reduce the second spectrum at the telephoto end when the zoom ratio is increased. As a result, it becomes difficult to achieve a high optical performance for the entire zooming range.

SUMMARY OF THE INVENTION

According to an aspect of the present invention, a zoom lens includes, in order from an object side to an image side, a first lens unit having a positive refractive power, a second lens unit having a negative refractive power, a third lens unit having a positive refractive power, and a rear lens unit including one or more lens units. During zooming, an interval between respective adjacent lens units varies such that an interval between the first lens unit and the second lens unit is larger at a telephoto end than at a wide-angle end, and an interval between the second lens unit and the third lens unit is smaller at the telephoto end than at the wide-angle end. The third lens unit includes at least one negative lens. When $\nu d3n$ and $\theta gF3n$ are respectively an Abbe number and a relative partial dispersion of a material of the negative lens, the following conditions are satisfied:

$$(-1.68 \times 10^{-3} \times \nu d3n + 0.570) < \theta gF3n < (3.15 \times 10^{-4} \times \nu d3n^2 - 1.86 \times 10^{-2} \times \nu d3n + 0.878),$$

$$5 < \nu d3n < 27.$$

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A, 2B, and 2C are aberration charts of the zoom lens according to the first exemplary embodiment at the wide-angle end, at a middle focal length, and at the telephoto end, respectively.

FIGS. 4A, 4B, and 4C are aberration charts of the zoom lens according to the second exemplary embodiment at the wide-angle end, at a middle focal length, and at the telephoto end, respectively.

FIG. 5 is a lens cross section of a zoom lens according to a third exemplary embodiment at the wide-angle end.

FIGS. 6A, 6B, and 6C are aberration charts of the zoom lens according to the third exemplary embodiment at the wide-angle end, at a middle focal length, and at the telephoto end, respectively.

FIGS. 8A, 8B, and 8C are aberration charts of the zoom lens according to the fourth exemplary embodiment at the wide-angle end, at a middle focal length, and at the telephoto end, respectively.

DESCRIPTION OF THE EMBODIMENTS

Figure 1:
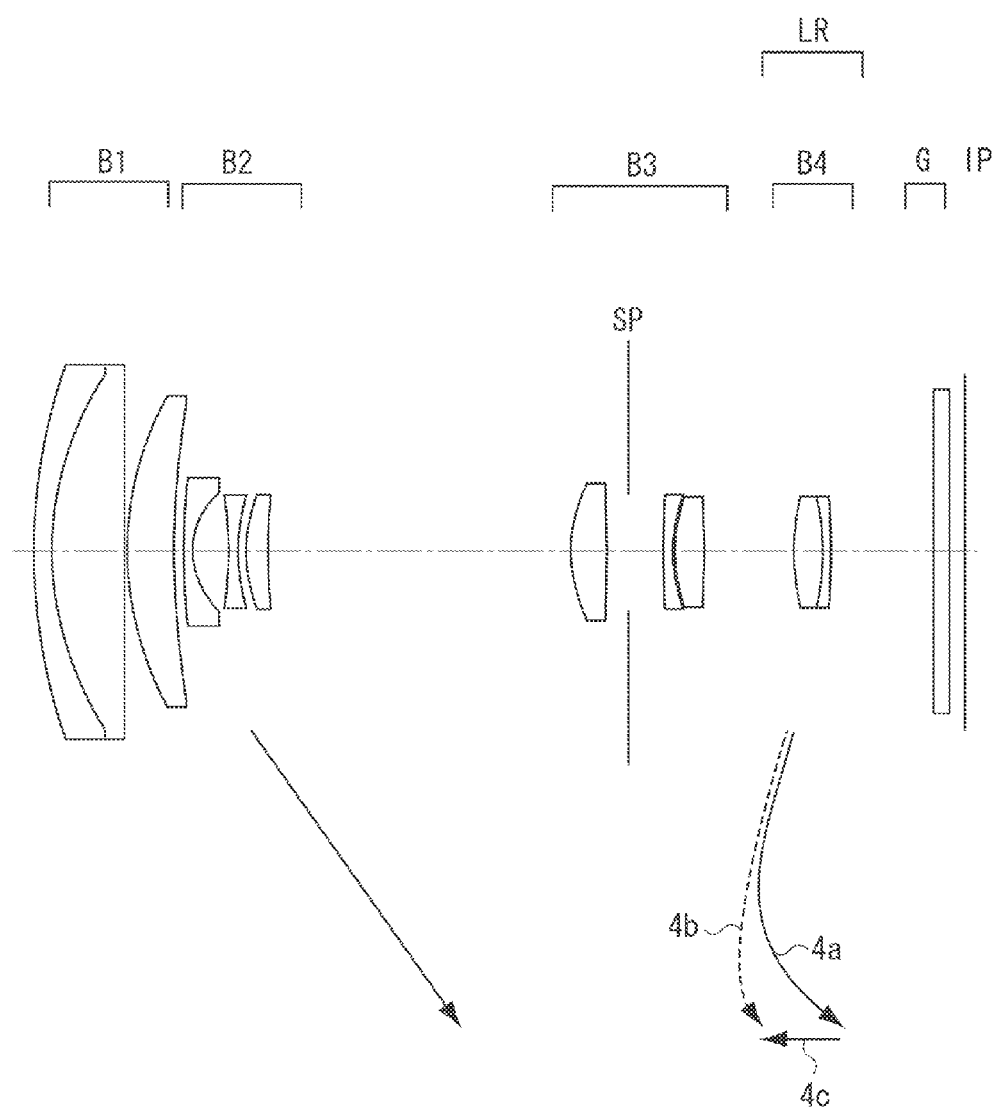
FIG. 1 is a lens cross section of a zoom lens according to a first exemplary embodiment at the wide-angle end.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed in subsequent figures.

Note that herein when referring to correcting or corrections of an error (e.g., aberration), a reduction of the error and/or a correction of the error is intended. In addition, as used herein, the side of a lens where an object to be imaged is located is referred to as the object side or front side of the lens; and the side of the lens where the image of the object is formed is referred to as the image side or back side of the lens.

A zoom lens according to an exemplary embodiment of the present invention includes, in order from the object side to the image side, a first lens unit having a positive refractive power (optical power=the inverse of the focal length), a second lens unit having a negative refractive power, a third lens unit having a positive refractive power, and a rear lens unit including one or more lens units.

During zooming, an interval between the respective adjacent lens units varies for zooming such that the interval between the first lens unit and the second lens unit is larger at the telephoto end than at the wide-angle end and the interval between the second lens unit and the third lens unit is smaller at the telephoto end than at the wide-angle end.

FIG. 1 is a lens cross section of a zoom lens according to a first exemplary embodiment at the wide-angle end (short focal length end). FIGS. 2A through 2C are aberration charts of the zoom lens according to the first exemplary embodiment at the wide-angle end, at a middle focal length, and at a telephoto end (long focal length end), respectively.

Figure 3:
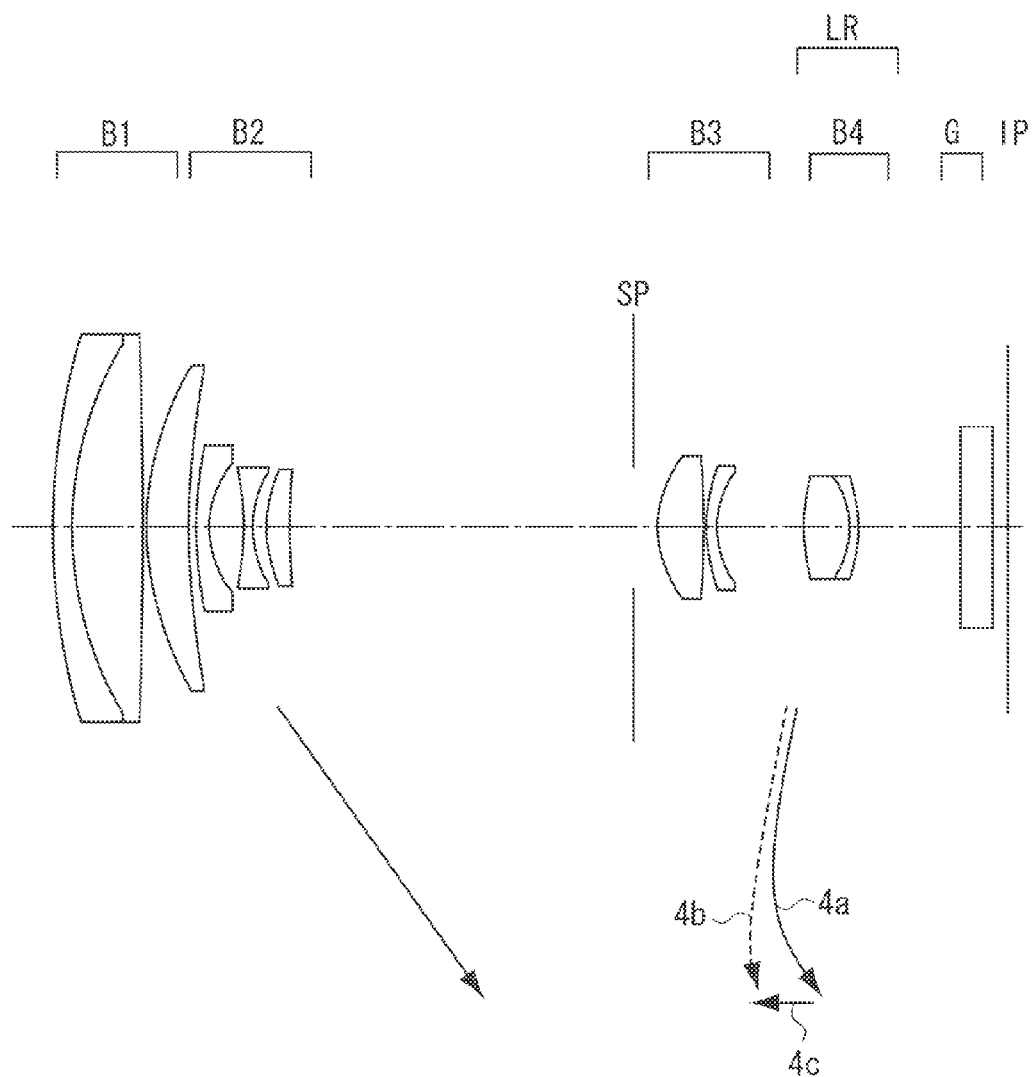
FIG. 3 is a lens cross section of a zoom lens according to a second exemplary embodiment at the wide-angle end.

FIG. 3 is a lens cross section of a zoom lens according to a second exemplary embodiment at the wide-angle end. FIGS. 4A through 4C are aberration charts of the zoom lens according to the second exemplary embodiment at the wide-angle end, at a middle focal length, and at the telephoto end, respectively.

FIG. 5 is a lens cross section of a zoom lens according to a third exemplary embodiment at the wide-angle end. FIGS. 6A through 6C are aberration charts of the zoom lens according to the third exemplary embodiment at the wide-angle end, at a middle focal length, and at the telephoto end, respectively.

Figure 7:
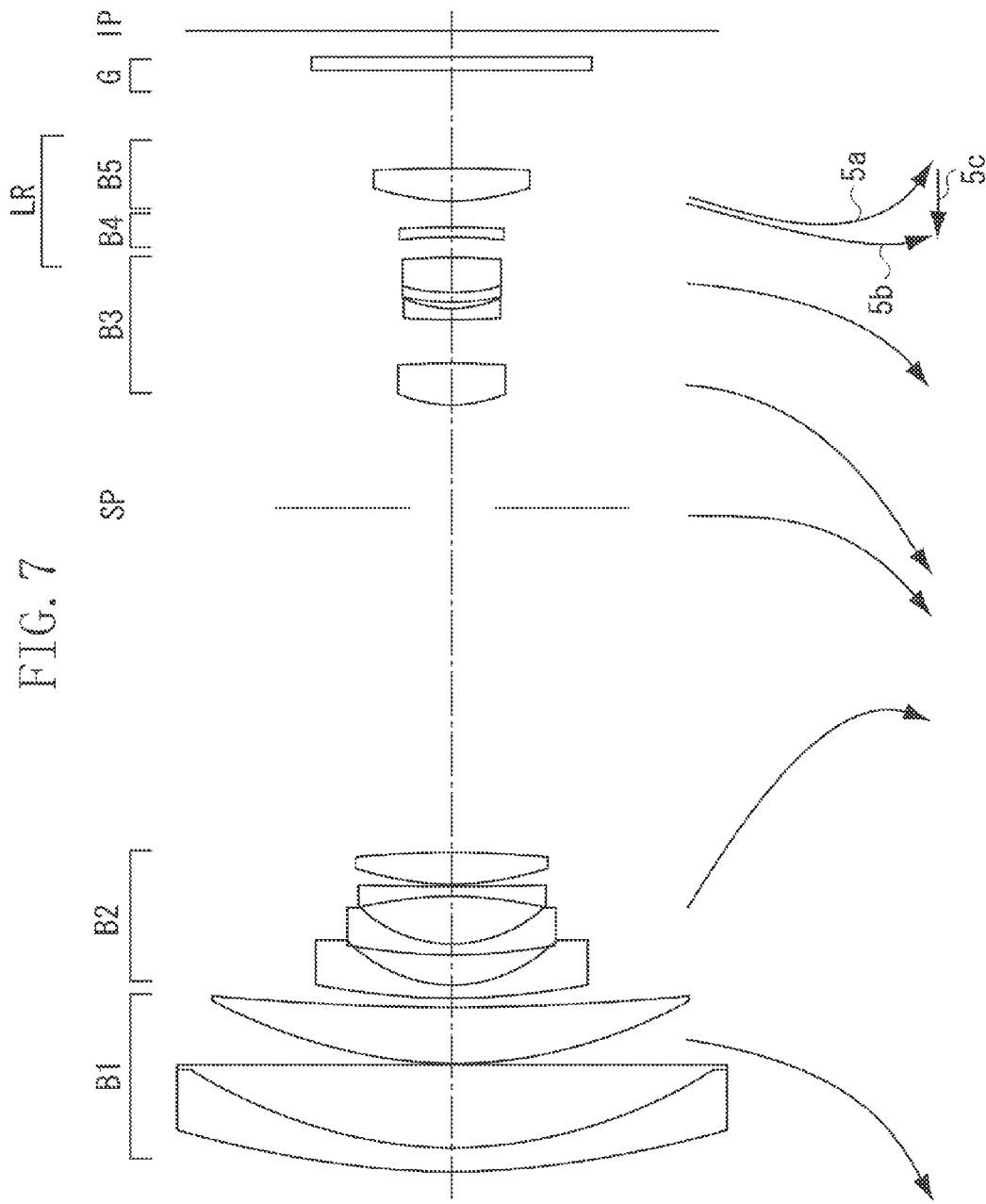
FIG. 7 is a lens cross section of a zoom lens according to a fourth exemplary embodiment at the wide-angle end.
Figure 8B:
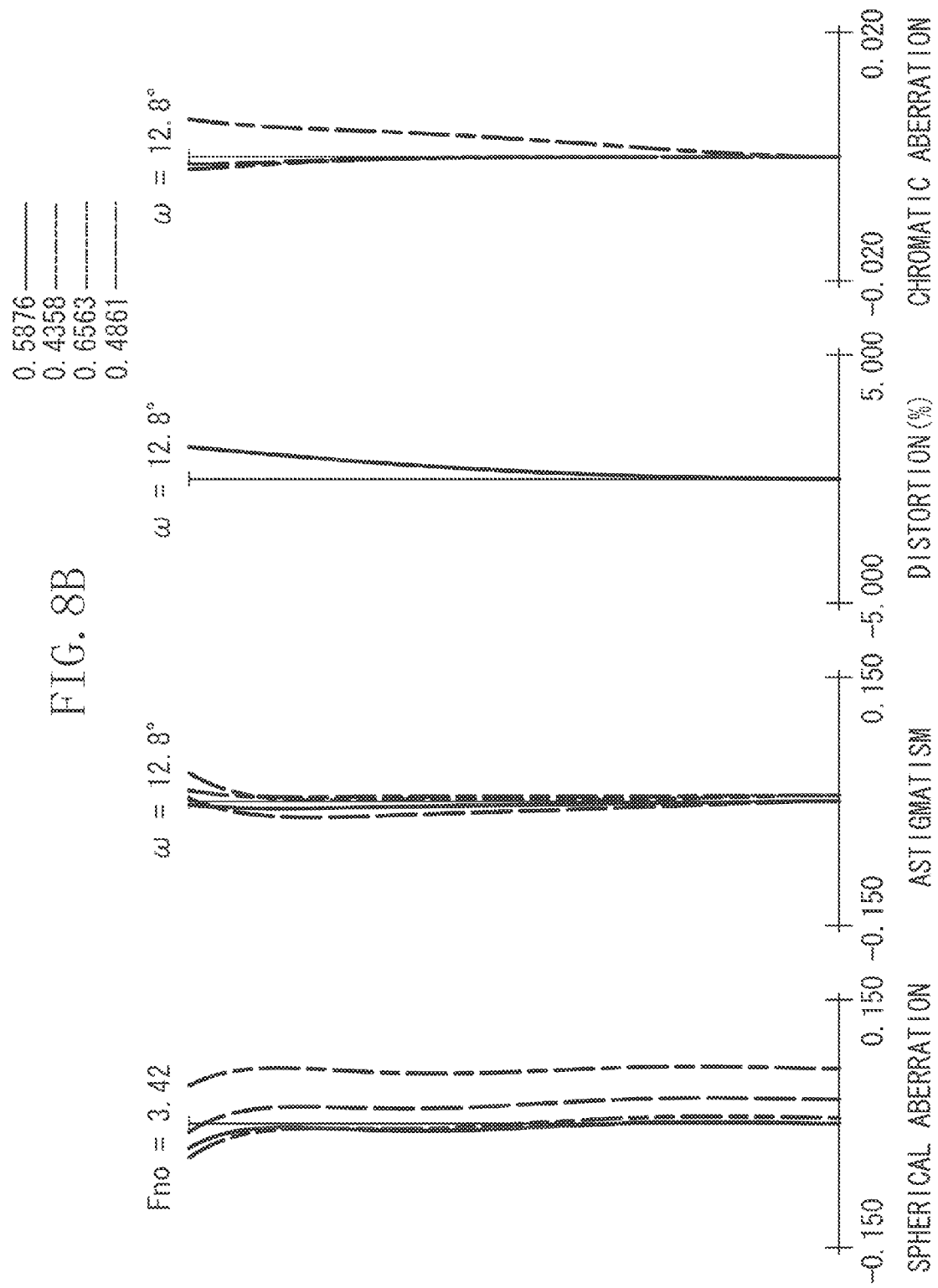

FIG. 7 is a lens cross section of a zoom lens according to a fourth exemplary embodiment at the wide-angle end. FIGS. 8A through 8C are aberration charts of the zoom lens according to the fourth exemplary embodiment at the wide-angle end, at a middle focal length, and at the telephoto end, respectively.

Figure 9:
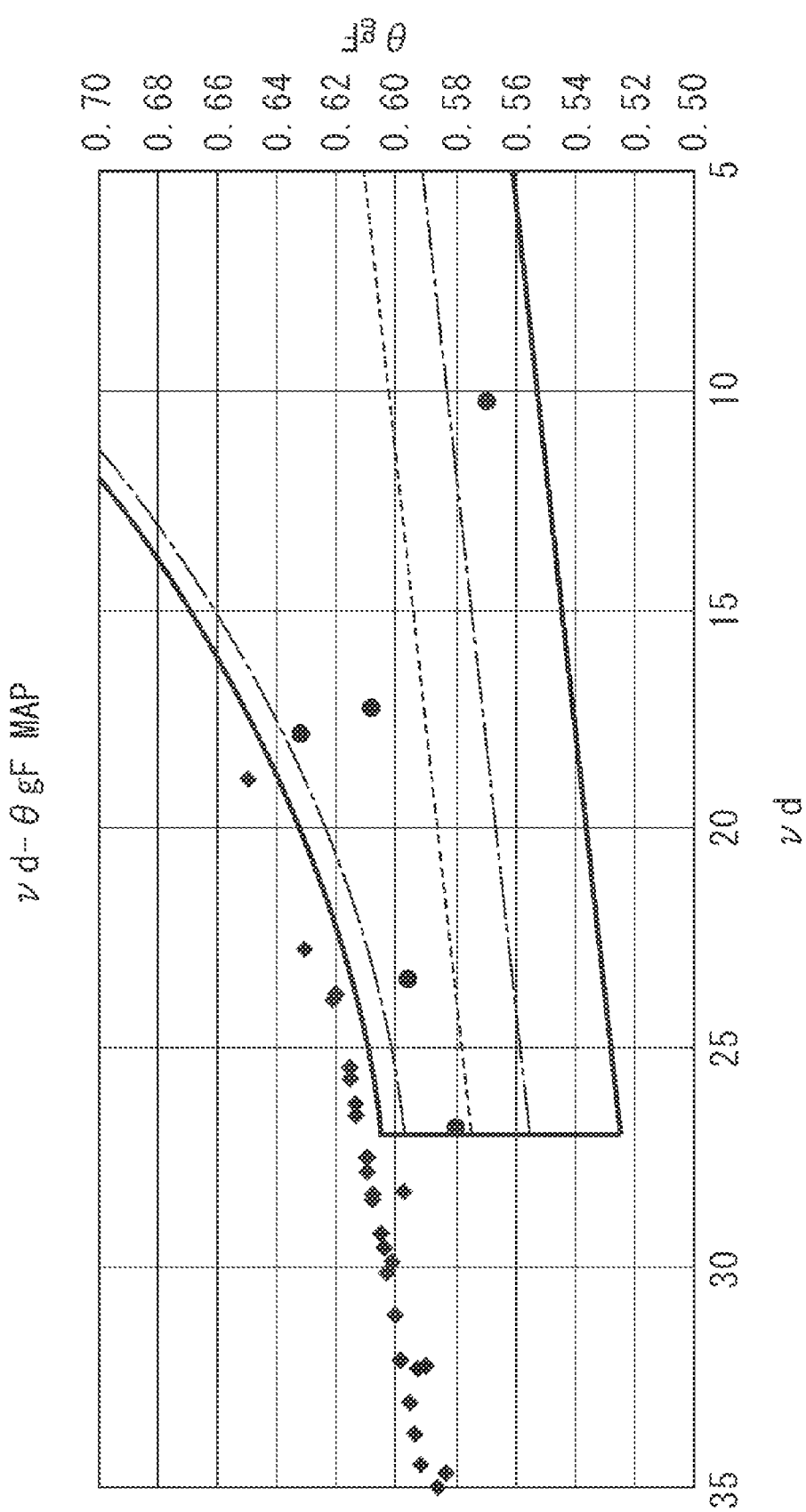
FIG. 9 illustrates an exemplary relationship between an Abbe number vd and a relative partial dispersion θgF according to an exemplary embodiment of the present invention.
Figure 10:
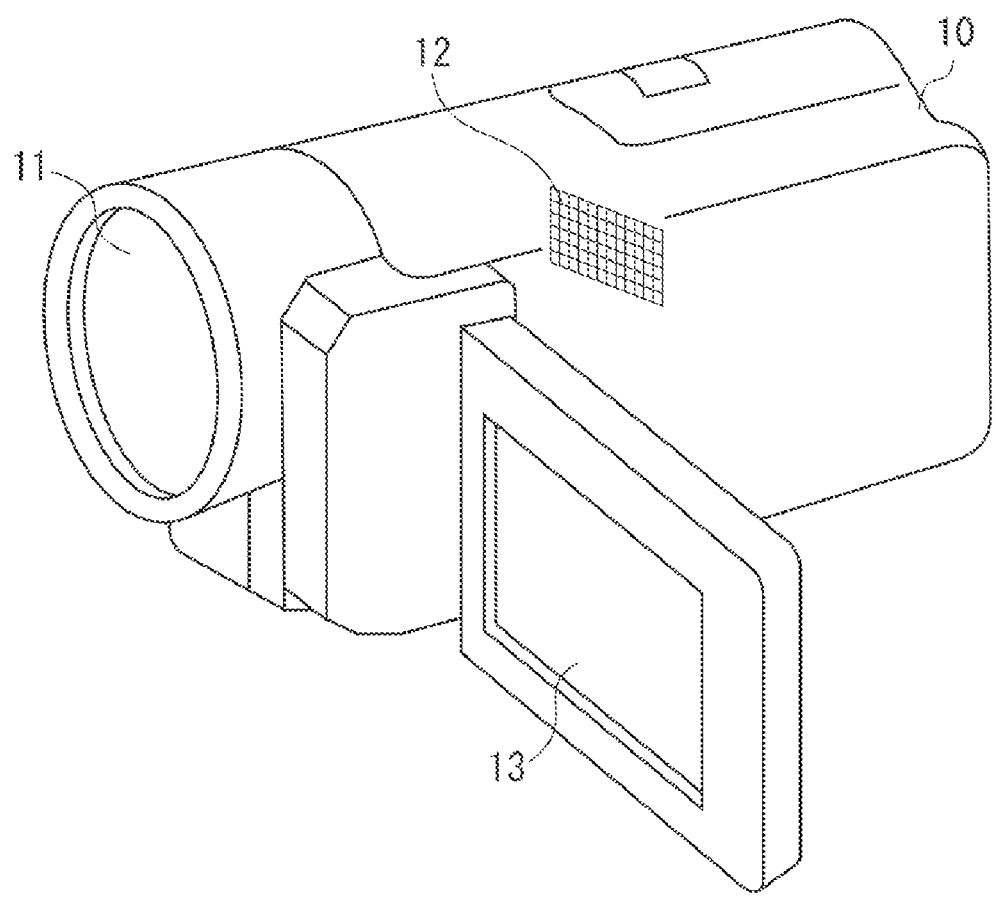
FIG. 10 illustrates a first image pickup apparatus that uses the zoom lens according to an exemplary embodiment of the present invention.
Figure 11:
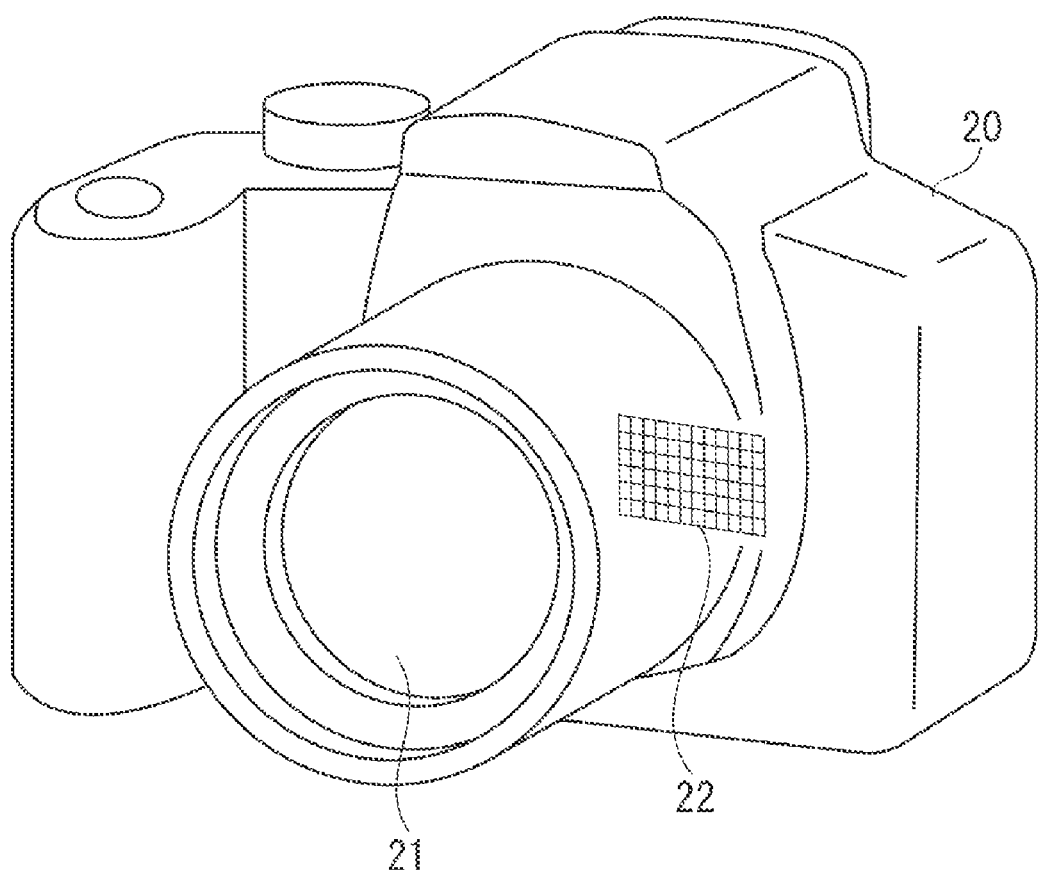
FIG. 11 illustrates a second image pickup apparatus that uses the zoom lens according to an exemplary embodiment of the present invention.

FIG. 9 illustrates an exemplary relationship between an Abbe number vd and a relative partial dispersion θgF according to an exemplary embodiment of the present invention. FIG. 10 illustrates main components of a video camera (image pickup apparatus) that uses the zoom lens according to an exemplary embodiment of the present invention. FIG. 11 illustrates main components of a video camera (image pickup apparatus) that uses the zoom lens according to an exemplary embodiment of the present invention.

The zoom lens according to each exemplary embodiment is a photographic lens system used in an image pickup apparatus, such as a video camera, a digital still camera, a silver-halide film camera, or a TV camera. The zoom lens according to each exemplary embodiment can be used as a projection optical system for a projection apparatus (projector).

In each of the diagrams showing a cross section of the zoom lens (FIGS. 1, 3, 5, and 7), "i" denotes an order of a lens unit from the object side. "Bi" denotes an i-th lens unit. "LR" denotes a rear lens unit including one or more lens units. Furthermore, "SP" denotes an aperture stop. "FP" (FIG. 5) denotes a flare cut stop. "G" denotes an optical block, such as an optical filter, a faceplate, a low-pass filter, or an infrared cut filter.

"IP" denotes an image plane. The image plane IP is, when the zoom lens according to an exemplary embodiment of the present invention is used as a photographic optical system of a video camera or a digital camera, equivalent to an imaging plane of a solid-state image sensor (photoelectric conversion element), such as a charge-coupled device (CCD) sensor or a complementary metal-oxide semiconductor (CMOS) sensor. If the zoom lens according to an exemplary embodiment of the present invention is used as a photographic optical system of a silver-halide film camera, the image plane IP is a photosensitive surface equivalent to a film surface of the optical system of the silver-halide film camera. In each of the diagrams showing a cross section of the zoom lens (FIGS. 1, 3, 5, and 7), each lens unit moves along a moving locus indicated by an arrow during zooming from the wide-angle end to the telephoto end (variable magnification).

The aberration charts (FIGS. 2A through 2C, 4A through 4C, 6A through 6C, and 8A through 8C) illustrate spherical aberration, astigmatism, distortion, and chromatic aberration of magnification, respectively. In a portion of each aberration chart (FIGS. 2A through 2C, 4A through 4C, 6A through 6C, and 8A through 8C) showing spherical aberration, the solid line denotes spherical aberration with respect to d-line light (wavelength: 587.6 nm). The alternate long and two short dashes line denotes spherical aberration with respect to g-line light (wavelength: 435.8 nm). The alternate long and short dashed lines denote spherical aberration with respect to C-line light (wavelength: 656.3 nm). The dotted line denotes spherical aberration with respect to F-line light (wavelength: 486.1 nm).

In a portion of each aberration chart (FIGS. 2A through 2C, 4A through 4C, 6A through 6C, and 8A through 8C) showing astigmatism, the solid line and the dotted line denote a sagittal image plane and a meridional image plane with respect to d-line light, respectively. The alternate long and two short dashes line and the alternate long and short dashed lines denote a sagittal image plane and a meridional image plane with respect to g-line light, respectively.

Distortion is represented with respect to d-line light. In a portion of each aberration chart (FIGS. 2A through 2C, 4A through 4C, 6A through 6C, and 8A through 8C) showing chromatic aberration of magnification, the alternate long and two short dashes line, the alternate long and short dashed lines, and the dotted line denote chromatic aberration of magnification with respect to g-line light, C-line light, and F-line light, respectively.

In each of the following exemplary embodiments, each of the wide-angle end and the telephoto end refers to a zooming position when a lens unit for variable magnification is positioned at each of the ends of a range in which the magnification varying lens unit can mechanically move along the optical axis.

A zoom lens according to each exemplary embodiment includes, in order from the object side to the image side, a first lens unit B1 having a positive refractive power, a second lens unit B2 having a negative refractive power, a third lens unit B3 having a positive refractive power, and a rear lens unit LR having an overall positive refractive power, which includes one or more lens units. During zooming, an interval between the respective adjacent lens units varies.

In the first through the third exemplary embodiments of the present invention, the rear lens unit LR includes a fourth lens unit B4 having a positive refractive power. In the fourth exemplary embodiment, the rear lens unit LR includes a fourth lens unit B4 having a negative refractive power and a fifth lens unit B5 having a positive refractive power.

However, in each exemplary embodiment, the rear lens unit LR can include an arbitrary number of lens units. In other words, in each exemplary embodiment, the rear lens unit LR can include at least one lens unit.

In the zoom lens according to each exemplary embodiment, the third lens unit B3 includes at least one negative lens. An Abbe number and a relative partial dispersion of a material of the negative lens (vd3$n$, θgF3$n$) satisfy the following conditions:

$$(-1.68\times10^{-3}\times vd3n+0.570<\theta gF3n<(3.15\times10^{-4}\times vd3n^2-1.86\times10^{-2}\times vd3n+0.878) \quad (1)$$

$$5<vd3n<27 \quad (2).$$

The Abbe number vd and the relative partial dispersion θgF of a material can be defined by the following expressions:

$$vd=(Nd-1)/(NF-NC)$$

$$\theta gF=(Ng-NF)/(NF-NC)$$

where "Nd", "NF", "NC", and "Ng" denote refractive indices of Fraunhofer lines with respect to d-line light, F-line light, C-line light, and g-line light, respectively.

In order to achieve a zoom lens having a high zoom ratio and capable of appropriately correcting various aberrations, the zoom lens according to each exemplary embodiment includes, in order from the object side to the image side, a first lens unit having a positive refractive power, a second lens unit having a negative refractive power, a third lens unit having a positive refractive power, and a rear lens unit including one or more lens units.

In addition, the zoom lens according to each exemplary embodiment uses a high dispersion material having anomalous dispersion that satisfies the above-described conditions (1) and (2) as a material of at least one negative lens included in the third lens unit B3 having a positive refractive power. Accordingly, the zoom lens according to each exemplary embodiment can achieve a zoom lens having a high zoom ratio while appropriately reducing the secondary spectrum at the telephoto end. In particular, because the third lens unit B3 includes the negative lens made of the material that satisfies the conditions (1) and (2) at the same time, the zoom lens according to each exemplary embodiment can appropriately execute primary achromatism and appropriately correct the secondary spectrum.

FIG. 9 illustrates an exemplary relationship between an Abbe number vd and a relative partial dispersion θgF according to an exemplary embodiment of the present invention. Referring to FIG. 9, Abbe numbers vd and relative partial dispersions θgF existing within an area surrounded by solid lines satisfy the conditions (1) and (2). Black dots illustrated in FIG. 9 indicate values of an existing optical material.

The condition (1) provides a condition for the relative partial dispersion of the material of at least one negative lens included in the third lens unit B3. The material satisfying the condition (1) has anomalous dispersion. In other words, a material that does not satisfy the range of the condition (1) does not have sufficiently high relative partial dispersion, which is required to appropriately reduce the secondary spectrum.

For example, if the negative lens contains 20 mol % or higher of tellurium dioxide ($TeO_2$) as one of glass components thereof, the values of the Abbe number vd and the relative partial dispersion θgF can be controlled to desired values. If the above-described negative lens is used, the negative lens can be easily assigned with a high refractive power because the environmental resistance, the manufacturability, and the thickness of the optical element are not restricted. This is the point of difference from a case if an optical element constituted by a replica layer, such as a resin layer, is used.

In order to more easily increase the refractive index of the glass material and to increase the effect of correcting various aberrations, it is further useful if the range of the value in the condition (1) is altered as follows:

$$-1.68\times10^{-3}\times vd3n+0.600<\theta gF3n<3.15\times10^{-4}\times vd3n^2-1.86\times10^{-2}\times vd3n+0.878 \quad (1a).$$

In order to yet more easily increase the refractive index of the glass material and to further increase the effect of correcting various aberrations, it is yet further useful if the range of the value in the condition (1a) is altered as follows:

$$-1.68\times10^{-3}\times vd3n+0.620<\theta gF3n<(3.15\times10^{-4}\times vd3n^2-1.86\times10^{-2}\times vd3n+0.878 \quad (1b).$$

In order to yet still more easily increase the refractive index of the glass material and to yet further increase the effect of correcting various aberrations, it is yet still further useful if the range of the value in the condition (1b) is altered as follows:

$$-1.68\times10^{-3}\times vd1n+0.620<\theta gF1n<3.15\times10^{-4}\times vd1n^2-1.86\times10^{-2}\times vd1n+0.80 \quad (1c).$$

The condition (2) provides a condition for the Abbe number of the material of the negative lens included in the third lens unit B3. If the upper limit value of the condition (2) is exceeded, then the dispersion may decrease to an extremely low level. As a result it becomes difficult to correct primary chromatic aberration occurring in a positive lens included in the third lens unit B3.

In order to increase the effect of the primary achromatism, it is further useful if the range of the value in the condition (2) is altered as follows:

$$10 < \nu d3n < 27 \tag{2a}$$

In order to yet more easily increase the effect of the primary achromatism, it is yet further useful if the range of the value in the condition (2a) is altered as follows:

$$15 < \nu d3n < 27 \tag{2b}$$

In order to yet still more easily increase the effect of the primary achromatism, it is yet still further useful if the range of the value in the condition (2b) is altered as follows:

$$15 < \nu d3n < 25 \tag{2c}$$

With the above-described configuration, each exemplary embodiment of the present invention can achieve a zoom lens having a high zoom ratio and a high optical performance for the entire zooming range.

It is further useful if the zoom lens according to each exemplary embodiment satisfies at least one of the following conditions. A focal length of the at least one negative lens of the third lens unit B3 (f3n), a refractive index of a material of the at least one negative lens of the third lens unit B3 (Nd3n), focal lengths of the first lens unit B1, the second lens unit B2, and the third lens unit B3 (f1, f2, f3), focal lengths of the entire zoom lens at the wide-angle end and at the telephoto end (fW, fT), an F-number at the telephoto end (FnoT), a thickness of the at least one negative lens of the third lens unit B3 on the optical axis (t3n), and a thickness of a lens having a smallest thickness value on the optical axis among lenses included in the first lens unit B1 (t1min) satisfy at least one of the following conditions:

$$0.5 < |f3n|/f3 < 6.0 \tag{3}$$

$$5.0 < fT/|f2| < 25.0 \tag{4}$$

$$0.1 < f3/fT < 1.0 \tag{5}$$

$$3.2 < (fT/fW)/FnoT < 15 \tag{6}$$

$$1.84 < Nd3n < 2.50 \tag{7}$$

$$3.0 < f1/|f2| < 10.0 \tag{8}$$

$$0.8 < t1min/t3n < 5.0 \tag{9}$$

The technical significance of each of the conditions (3) through (9) will be described in detail below. The condition (3) provides a condition for the focal length of the at least one negative lens included in the third lens unit B3, which is made of a high dispersion material and which has anomalous dispersion.

If the focal length of the high dispersion negative lens having anomalous dispersion becomes longer exceeding the upper limit value of the condition (3) (i.e., if the refractive power of the negative lens becomes very low), then it becomes difficult to increase the effect of variable magnification by the third lens unit B3. As a result, the lens total length of the entire zoom lens may become very long. Accordingly, in this case, it becomes difficult to reduce the size of the entire zoom lens.

On the other hand, if the focal length of the negative lens becomes very short exceeding the lower limit value of the condition (3) (i.e., if the refractive power of the negative lens becomes very high), then the Petzval sum may become very large in the direction of the negative sign value. As a result, it becomes difficult to suppress curvature of field. In addition, in this case, it becomes difficult to suppress high-order spherical aberration and chromatic spherical aberration.

In order to further appropriately correct spherical aberration at the telephoto end, it is further useful if the range of the value in the condition (3) is altered as follows:

$$0.5 < |f3n|/f3 < 3.0 \tag{3a}$$

In order to yet further appropriately correct spherical aberration at the telephoto end, it is yet further useful if the range of the value in the condition (3a) is altered as follows:

$$0.6 < |f3n|/f3 < 1.2 \tag{3b}$$

The condition (4) provides a condition for the focal length of the entire optical system at the telephoto end based on the focal length of the second lens unit B2. If the focal length of the second lens unit B2 becomes smaller exceeding the upper limit value of the condition (4), then the Petzval sum may become very large in the direction of the negative sign value although the zoom ratio can be more easily increased and the lens total length can be more easily reduced in this case. As a result, the amount of curvature of field may increase.

If the focal length of the second lens unit B2 becomes longer exceeding the lower limit value of the condition (4), then it becomes necessary, in order to achieve a high zoom ratio, to increase the amount of movement of the second lens unit B2 during zooming or to increase the effect of variable magnification by the third lens unit B3.

If the amount of movement of the second lens unit B2 during zooming is merely increased, the lens total length may increase. If the effect of variable magnification by the third lens unit B3 is merely increased, it becomes difficult to balancedly correct spherical aberration and coma for the entire zooming range.

In order to more effectively suppress curvature of field and astigmatism for the entire zooming range, it is further useful if the range of the value in the condition (4) is altered as follows:

$$7.0 < fT/|f2| < 20.0 \tag{4a}$$

The condition (5) provides a condition for the focal length of the entire zoom lens at the telephoto end based on the focal length of the third lens unit B3.

If the focal length of the third lens unit B3 becomes longer exceeding the upper limit value of the condition (5), then the effect of correcting spherical aberration becomes extremely low. As a result, it becomes necessary to correct spherical aberration by the lens units subsequent to the third lens unit B3. Accordingly, in this case, the total number of constituent lenses may increase.

If the focal length of the third lens unit B3 becomes shorter exceeding the lower limit value of the condition (5), then it becomes difficult to balancedly correct spherical aberration and coma for the entire zooming range. As a result, the sensitivity of the zoom lens to manufacturing errors may become high in relation to the difference between the level of axial coma and curvature of field, which may occur due to relative eccentricity of the third lens unit B3 and lens units subsequent to the third lens unit B3.

In order to more effectively correct spherical aberration and more easily reduce the total size of the entire zoom lens, it is further useful if the range of the value in the condition (5) is altered as follows:

$$0.1 < f3/fT < 0.5 \tag{5a}$$

The condition (6) provides a condition for the ratio between the focal lengths of the entire zoom lens at the wide-angle end and at the telephoto end based on the F-number at the telephoto end.

If the F-number at the telephoto end becomes greater exceeding the upper limit value of the condition (6), then the amount of variation on the image plane, which may occur due to the stop, may increase although a high quality image can be formed without sufficiently correcting spherical aberration and axial chromatic aberration at the telephoto end.

If the F-number at the telephoto end becomes lower exceeding the lower limit value of the condition (6), then it is required to increase the number of lenses included in the first lens unit B1 to correct spherical aberration at the telephoto end. In addition, in this case, it is required to increase the outer diameter of the lens. As a result, the quantity of flare components of the off-axis rays may increase for the entire zooming range.

It is further useful if the range of the value in the condition (6) is altered as follows:

$$3.25<(fT/fW)/FnoT<6.50 \tag{6a}$$

The condition (7) provides a condition for the refractive index of the material of the at least one negative lens included in the third lens unit B3. If the refractive index of the material of the at least one negative lens of the third lens unit B3 becomes higher than the upper limit value of the condition (7), then the radius of curvature of the lens surface may become very large. As a result, various aberrations, such as spherical aberration, cannot be appropriately corrected at the telephoto end.

On the other hand, if the refractive index of the material of the at least one negative lens of the third lens unit B3 becomes lower than the lower limit value of the condition (7), the radius of curvature may become small to assign predetermined power to the negative lens. As a result, it becomes difficult to correct astigmatism. In addition, in this case, it becomes difficult to reduce the total size of the entire zoom lens.

It is further useful if the range of the value in the condition (7) is altered as follows:

$$1.84<Nd3n<2.20 \tag{7a}$$

The condition (8) provides a condition for appropriately setting the focal length of the second lens unit B2, for maintaining an appropriate zoom ratio, and for appropriately correcting the Petzval sum.

If the upper limit value of the condition (8) is exceeded, then the amount of variation of aberration in the first lens unit B1 and the second lens unit B2 that may occur during zooming may become very large. As a result, it becomes difficult to correct various aberrations, such as curvature of field.

On the other hand, if the lower limit value of the condition (8) is exceeded, then it becomes necessary to move the second lens unit B2 during zooming by a great amount to achieve a high zoom ratio. Furthermore, the lens total length and the outer diameter of the lens may increase.

In order to effectively correct aberration, it is further useful if the range of the value in the condition (8) is altered as follows:

$$4.0<f1/|f2|<7.0 \tag{8a}$$

The condition (9) provides a condition for appropriately correcting chromatic aberration by the at least one negative lens included in the third lens unit B3 and for balancedly correcting spherical aberration and coma.

If the upper limit value of the condition (9) is exceeded, then it is required to increase the size of the negative lens included in the third lens unit B3.

If the lower limit value of the condition (9) is exceeded, then it becomes difficult to maintain a sufficiently high power of the negative lens included in the third lens unit B3. As a result, it becomes difficult to appropriately correct spherical aberration and coma at the telephoto end.

In order to effectively correct aberration, it is further useful if the range of the value in the condition (9) is altered as follows:

$$0.9<t1\min/t3n<4.0 \tag{9a}$$

In the zoom lens according to each exemplary embodiment of the present invention, the Knoop hardness of the material of the at least one negative lens included in the third lens unit B3 (Hk3n) and a smallest Knoop hardness among those of materials of lenses included in the first lens unit B1 (Hk1min) can satisfy the following condition:

$$0.5<Hk3n/Hk1\min \tag{10}$$

The condition (10) provides a condition in relation to the deformation of the glass material of the lens, which may occur when any external force is applied to the lens or due to the self weight of the material or due to physical tightening on the lens. If the lower limit value of the condition (10) is exceeded, then the mechanical strength may becomes insufficient. As a result, the lens may be deformed or warped.

In addition, it is useful if the third lens unit B3 has at least one aspheric lens surface. With the above-described configuration, each exemplary embodiment of the present invention can easily achieve a high aperture ratio. Furthermore, with the above-described configuration, each exemplary embodiment can achieve a relatively small F-number at the telephoto end. In addition, in each exemplary embodiment having the above-described configuration, the configuration of the lens units subsequent to the third lens unit B3 can be simplified.

In addition, it is useful if the rear lens unit LR has an overall positive refractive power (i.e., the overall refractive power acquired by combining the refractive powers of the lens units included in the rear lens unit LR). By assigning an overall positive refractive power to the rear lens unit LR, it becomes easy for the zoom lens according to each exemplary embodiment to achieve a high optical performance.

In the zoom lens according to each exemplary embodiment, the rear lens unit LR can include a fourth lens unit having a positive refractive power. Alternatively, the rear lens unit LR can include the fourth lens unit B4 having a negative refractive power and the fifth lens unit B5 having a positive refractive power. With the above-described configuration, each exemplary embodiment of the present invention can achieve a zoom lens having an appropriately short lens total length with a simple configuration while achieving a desired ratio of focal lengths (zoom ratio) at the same time.

In the first and the second exemplary embodiments illustrated in FIGS. 1 and 3, during zooming from the wide-angle end to the telephoto end, variable magnification is executed by moving the second lens unit B2 towards the image side and variation on the image plane, which may occur due to variable magnification, is corrected by moving the fourth lens unit B4 partially along a locus convex towards the object side.

The zoom lens according to each exemplary embodiment is a rear focus type zoom lens, which executes focusing by moving the fourth lens unit B4 along the optical axis. In the examples illustrated in FIGS. 1 and 3, the fourth lens unit B4 moves along a moving locus, which is indicated by a solid curve 4a or a dotted curve 4b, to correct variation on the image plane that may occur during zooming from the wide-angle end to the telephoto end when focusing on an infinitely-distant object and on a short-distance object.

By moving the fourth lens unit B4 along a locus convex towards the object side, each exemplary embodiment can effectively utilize the space existing between the third lens unit B3 and the fourth lens unit B4. In addition, each exemplary embodiment can effectively reduce the lens total length. The first lens unit B1, the third lens unit B3, and the aperture stop SP are stationary during zooming and focusing.

In each exemplary embodiment, focusing is executed, from the infinitely-distant object to a short-distance object at a zooming position at the telephoto end, by moving the fourth lens unit B4 towards the front (towards the object side) as indicated by an arrow 4c.

In the first exemplary embodiment, the third lens unit B3 includes, in order from the object side to the image side, a positive lens, an aperture stop SP, a negative lens made of a material having anomalous dispersion, and a positive lens.

In the second exemplary embodiment, the third lens unit B3 includes, in order from the object side to the image side, a positive lens and a negative lens, which is made of a material having anomalous dispersion.

In the third exemplary embodiment illustrated in FIG. 5, during zooming (variable magnification) from the wide-angle end to the telephoto end, the first lens unit B1 moves towards the object side. The second lens unit B2 moves towards the image side. The third lens unit B3 moves towards the object side. The aperture stop SP, which is provided on the object side of the third lens unit B3, moves along a locus convex towards the object side. The fourth lens unit B4 moves along a locus convex towards the object side to correct variation on the image plane that may occur due to variable magnification.

Similar to the first and the second exemplary embodiments described above, the third exemplary embodiment employs the rear focus method, which executes focusing by moving the fourth lens unit B4. In the third exemplary embodiment, the third lens unit B3 includes, in order from the object side to the image side, a positive lens, a negative lens made of a material having anomalous dispersion, and a positive lens.

In the fourth exemplary embodiment illustrated in FIG. 7, during zooming from the wide-angle end to the telephoto end, the second lens unit B2 moves towards the image side as indicated by an arrow. The first lens unit B1, the third lens unit B3, and the fourth lens unit B4 move towards the object side. The fifth lens unit B5 moves along a locus convex towards the object side to correct variation on the image plane that may occur due to variable magnification.

The fourth exemplary embodiment employs a rear focus method, which executes focusing by moving the fifth lens unit B5 along the optical axis. During focusing from an infinitely-distant object to a short-distance object, at the telephoto end, the fifth lens unit B5 is moved forward as indicated by an arrow 5c in FIG. 7.

In the example illustrated in FIG. 7, the fifth lens unit B5 moves along a moving locus, which is indicated by a solid curve 5a or a dotted curve 5b, to correct variation on the image plane that may occur during zooming from the wide-angle end to the telephoto end when focusing on an infinitely-distant object and on a short-distance object.

In the fourth exemplary embodiment, the third lens unit B3 includes, in order from the object side to the image side, a positive lens, a negative lens made of a material having anomalous dispersion, and a cemented lens constituted by a negative lens made of a material having anomalous dispersion and a positive lens.

Now, an exemplary embodiment of a camcorder (video camera) that uses the zoom lens according to each exemplary embodiment of the present invention as a photographic optical system will be described below with reference to FIG. 10. FIG. 10 illustrates main components of a camcorder (video camera) that uses the zoom lens according to an exemplary embodiment of the present invention.

Referring to FIG. 10, the camcorder includes a camera body 10 and a photographic optical system 11. The photographic optical system 11 is constituted by a zoom lens according to any one of the above-described exemplary embodiments. The camera body 10 includes a solid-state image sensor (photoelectrical conversion element) 12, such as a charge-coupled device (CCD) sensor or a complementary metal oxide semiconductor (CMOS) sensor. The image sensor 12 is provided inside the camera body 10. Furthermore, the image sensor 12 receives an object image formed by the photographic optical system 11. In addition, the camera body 10 includes a viewfinder 13, via which a user of the camera can observe an object image formed on the image sensor 12.

Now, an exemplary embodiment of a digital still camera (image pickup apparatus) that uses the zoom lens according to each exemplary embodiment of the present invention as a photographic optical system will be described below with reference to FIG. 11. FIG. 11 illustrates main components of a digital still camera (image pickup apparatus) that uses the zoom lens according to an exemplary embodiment of the present invention.

Referring to FIG. 11, the digital still camera includes a camera body 20 and a photographic optical system 21, which is constituted by the zoom lens according to any of the above-described exemplary embodiments of the present invention. In addition, the camera body 20 includes a solid-state image sensor (photoelectrical conversion element) 22, such as a CCD sensor or a CMOS sensor. The image sensor 22 is provided inside the camera body 20. Furthermore, the image sensor 22 receives an object image formed by the photographic optical system 21.

Numerical examples 1 through 4, which respectively correspond to the first through the fourth exemplary embodiments of the present invention, are set forth below. In each of the numerical examples 1 through 4, "i" (where i=1, 2, 3 . . . ) denotes the order of a surface from the object side, "ri" denotes a radius of curvature of an i-th optical surface (the i-th lens surface), "di" denotes an axial space between the i-th surface and the (i+1)-th surface, "ndi" and "vdi" respectively denote a refractive index and an Abbe number of the material of the i-th optical member with respect to d-line light. "θgF" denotes the relative partial dispersion. The last two surfaces closest to the image side is equivalent to a glass block G.

In addition, "K" denotes a conic coefficient. Each of "A3", "A4", "A5", "A6", "A7", "A8", "A9", and "A10" denotes an aspheric coefficient. The aspheric shape is expressed as $$X=(H^2/R)/[1+\{1-(1+K)(H/R)^2\}^{1/2}]+A3H^3+A4H^4+A5H^5+A6H^6+A7H^7+A8H^8+A9H^9+A10H^{10}$$

where "X" denotes a displacement from a surface vertex along the optical axis at a position at a height "H" from the optical axis, and "R" denotes a paraxial radius of curvature.

In each numerical example, an asterisk "*" denotes an aspheric surface. The scientific notation "e-x" for each aspheric coefficient is equivalent to the exponential notation "$1 \times 10^{-X}$". "BF" denotes an air-equivalent back focus. The relationship between each condition described above and each numerical example is set forth in Table 1.

Numerical Example 1

Unit: mm

Surface Data

| Surface No. | r | d | nd | νd | θgF |
|---|---|---|---|---|---|
| 1 | 37.524 | 1.15 | 1.84666 | 23.8 | 0.62046 |
| 2 | 20.941 | 4.70 | 1.60311 | 60.6 | 0.54143 |
| 3 | 991.493 | 0.20 | | | |
| 4 | 20.344 | 3.09 | 1.69680 | 55.5 | 0.54335 |
| 5 | 56.718 | Variable | | | |
| 6 | 43.614 | 0.60 | 1.88300 | 40.8 | 0.56672 |
| 7 | 5.143 | 2.38 | | | |
| 8 | −22.110 | 0.60 | 1.77250 | 49.6 | 0.55205 |
| 9 | 12.639 | 0.52 | | | |
| 10 | 10.317 | 1.48 | 1.92286 | 18.9 | 0.64952 |
| 11 | 54.045 | Variable | | | |
| 12* | 9.760 | 2.37 | 1.58313 | 59.4 | 0.54230 |
| 13 | −114.532 | 1.40 | | | |
| 14(Stop) | ∞ | 2.30 | | | |
| 15 | 50.939 | 0.60 | 1.84666 | 26.8 | 0.57997 |
| 16 | 9.313 | 0.13 | | | |
| 17* | 10.093 | 1.94 | 1.58313 | 59.4 | 0.54230 |
| 18 | −64.391 | Variable | | | |
| 19 | 15.566 | 1.88 | 1.80400 | 46.6 | 0.55718 |
| 20 | −16.628 | 0.55 | 1.92286 | 18.9 | 0.64952 |
| 21 | −46.465 | Variable | | | |
| 22 | ∞ | 1.00 | 1.51633 | 64.1 | 0.53524 |
| 23 | ∞ | 1.00 | | | |
| Image plane | ∞ | | | | |

Aspheric Coefficients

| r12 | κ = −9.06819e−001 | A4 = 3.08508e−005 |
|---|---|---|
| | A6 = −9.43703e−008 | A8 = 5.81160e−009 |
| r17 | κ = −2.96495e−001 | A4 = −1.68284e−004 |

Various Data
Zoom Ratio 14.80

| | Wide-angle end | Middle Focal Length | Telephoto end |
|---|---|---|---|
| Focal Length | 4.26 | 22.50 | 62.98 |
| F-number | 1.85 | 2.76 | 3.09 |
| Angle of View | 27.87 | 5.71 | 2.05 |
| Image Height | 2.25 | 2.25 | 2.25 |
| Lens Total Length | 60.67 | 60.67 | 60.67 |
| BF | 8.44 | 12.12 | 6.03 |
| d5 | 0.65 | 15.08 | 19.63 |
| d11 | 19.80 | 5.38 | 0.82 |
| d18 | 5.88 | 2.20 | 8.29 |
| d21 | 6.79 | 10.46 | 4.38 |

Various Data of Each Unit

| Lens unit | First surface | Focal length |
|---|---|---|
| 1 | 1 | 30.89 |
| 2 | 6 | −5.79 |
| 3 | 12 | 16.89 |
| 4 | 19 | 15.77 |
| 5 | 22 | ∞ |

Numerical Example 2

Unit: mm

Surface Data

| Surface No. | r | d | nd | νd | θgF |
|---|---|---|---|---|---|
| 1 | 43.894 | 1.20 | 1.84666 | 23.8 | 0.62046 |
| 2 | 23.000 | 4.66 | 1.60311 | 60.6 | 0.54143 |
| 3 | −280.034 | 0.20 | | | |
| 4 | 20.274 | 2.70 | 1.69680 | 55.5 | 0.54335 |
| 5 | 51.120 | Variable | | | |
| 6 | 28.122 | 0.80 | 1.88300 | 40.8 | 0.56672 |
| 7 | 6.540 | 2.26 | | | |
| 8 | −18.942 | 0.60 | 1.80400 | 46.6 | 0.55718 |
| 9 | 7.022 | 0.86 | | | |
| 10 | 8.972 | 1.52 | 1.92286 | 18.9 | 0.64952 |
| 11 | 36.078 | Variable | | | |
| 12(Stop) | ∞ | 1.56 | | | |
| 13* | 6.952 | 3.01 | 1.58313 | 59.4 | 0.54230 |
| 14* | −42.383 | 0.15 | | | |
| 15 | 10.978 | 0.70 | 1.84660 | 23.4 | 0.59564 |
| 16 | 6.327 | Variable | | | |
| 17 | 12.880 | 2.95 | 1.48749 | 70.2 | 0.53001 |
| 18 | −5.663 | 0.60 | 1.80610 | 33.3 | 0.58811 |
| 19 | −9.592 | Variable | | | |
| 20 | ∞ | 2.00 | 1.51633 | 64.1 | 0.53524 |
| 21 | ∞ | 1.00 | | | |
| Image plane | ∞ | | | | |

Aspheric Coefficients

| r13 | κ = −5.49204e−001 | A4 = −5.53825e−006 |
|---|---|---|
| | A6 = −2.35506e−007 | A8 = 9.95678e−009 |
| r14 | κ = −3.77037e+001 | A4 = 2.03627e−004 |
| | A6 = −2.32415e−006 | |

Various Data
Zoom Ratio 19.98

| | Wide-angle end | Middle Focal Length | Telephoto end |
|---|---|---|---|
| Focal Length | 3.62 | 9.89 | 72.39 |
| F-number | 1.85 | 2.20 | 3.50 |
| Angle of View | 28.90 | 11.44 | 1.58 |
| Image Height | 2.00 | 2.00 | 2.00 |
| Lens Total Length | 61.21 | 61.21 | 61.21 |
| BF | 8.99 | 11.56 | 5.18 |
| d5 | 0.55 | 10.66 | 20.78 |
| d11 | 22.28 | 12.16 | 2.05 |
| d16 | 5.63 | 3.06 | 9.44 |
| d19 | 6.67 | 9.24 | 2.86 |

Various Data of Each Unit

| Lens unit | First surface | Focal length |
|---|---|---|
| 1 | 1 | 31.49 |
| 2 | 6 | −5.45 |
| 3 | 12 | 17.64 |
| 4 | 17 | 15.64 |
| 5 | 20 | ∞ |

Numerical Example 3

Unit: mm

Surface Data

| Surface No. | r | d | nd | vd | θgF |
|---|---|---|---|---|---|
| 1 | 66.915 | 1.50 | 1.84666 | 23.8 | 0.62046 |
| 2 | 37.905 | 4.99 | 1.49700 | 81.5 | 0.53752 |
| 3 | −113.170 | 0.20 | | | |
| 4 | 28.084 | 3.16 | 1.69680 | 55.5 | 0.54335 |
| 5 | 67.192 | Variable | | | |
| 6 | 52.399 | 0.90 | 1.83481 | 42.7 | 0.56362 |
| 7 | 12.495 | 4.30 | | | |
| 8 | −24.582 | 0.75 | 1.60311 | 60.6 | 0.54143 |
| 9 | 12.239 | 1.68 | | | |
| 10 | 15.234 | 1.70 | 1.92286 | 18.9 | 0.64952 |
| 11 | 32.149 | Variable | | | |
| 12(Stop) | ∞ | Variable | | | |
| 13* | 9.641 | 3.33 | 1.58313 | 59.4 | 0.54230 |
| 14 | 69.685 | 3.91 | | | |
| 15 | 15.555 | 0.70 | 2.10500 | 17.2 | 0.60817 |
| 16 | 8.975 | 1.23 | | | |
| 17 | 42.529 | 1.42 | 1.84666 | 23.8 | 0.62046 |
| 18 | −326.495 | Variable | | | |
| 19 | ∞ | Variable | | | |
| 20 | 15.442 | 0.80 | 1.84666 | 23.8 | 0.62046 |
| 21 | 9.959 | 2.83 | 1.80400 | 46.6 | 0.55718 |
| 22 | 568.997 | Variable | | | |
| 23 | ∞ | 1.00 | 1.51633 | 64.1 | 0.53524 |
| 24 | ∞ | 1.50 | | | |
| Image plane | ∞ | | | | |

Aspheric Coefficients

| r13 | κ = −1.05690e+000 | A4 = 1.94658e−004 |
|---|---|---|
| | A6 = 3.70503e−005 | A8 = 5.70955e−007 |
| | A10 = −1.88292e−009 | |
| | A3 = −8.59213e−005 | A5 = −1.01902e−004 |
| | A7 = −6.93498e−006 | |

Various Data
Zoom Ratio 11.55

| | Wide-angle end | Middle Focal Length | Telephoto end |
|---|---|---|---|
| Focal Length | 6.48 | 19.86 | 74.82 |
| F-number | 2.00 | 2.90 | 3.50 |
| Angle of View | 29.06 | 10.28 | 2.75 |
| Image Height | 3.60 | 3.60 | 3.60 |
| Lens Total Length | 83.07 | 83.58 | 86.28 |
| BF | 12.26 | 15.41 | 8.13 |
| d5 | 0.80 | 14.54 | 26.06 |
| d11 | 24.46 | 8.43 | 3.00 |
| d12 | 9.20 | 6.47 | 1.62 |
| d18 | 1.16 | 2.61 | 4.29 |
| d19 | 1.79 | 2.71 | 9.78 |
| d22 | 10.10 | 13.25 | 5.97 |

Various Data of Each Unit

| Lens unit | First surface | Focal length |
|---|---|---|
| 1 | 1 | 44.37 |
| 2 | 6 | −10.48 |
| 3 | 12 | ∞ |
| 4 | 13 | 27.64 |
| 5 | 19 | ∞ |
| 6 | 20 | 20.25 |
| 7 | 23 | ∞ |

Numerical Example 4

Unit: mm

Surface Data

| Surface No. | r | d | nd | vd | θgF |
|---|---|---|---|---|---|
| 1 | 69.519 | 1.80 | 1.80610 | 33.3 | 0.58811 |
| 2 | 35.653 | 6.20 | 1.49700 | 81.5 | 0.53752 |
| 3 | 5960.101 | 0.20 | | | |
| 4 | 36.095 | 4.20 | 1.60311 | 60.6 | 0.54143 |
| 5 | 165.797 | Variable | | | |
| 6 | 52.500 | 1.00 | 1.88300 | 40.8 | 0.56672 |
| 7 | 10.848 | 2.30 | | | |
| 8 | 42.702 | 0.80 | 1.88300 | 40.8 | 0.56672 |
| 9 | 10.138 | 3.65 | | | |
| 10 | −27.807 | 0.70 | 1.80610 | 33.3 | 0.58811 |
| 11 | 165.235 | 0.20 | | | |
| 12 | 22.393 | 2.40 | 1.92286 | 18.9 | 0.64952 |
| 13 | −88.493 | Variable | | | |
| 14(Stop) | ∞ | Variable | | | |
| 15* | 9.850 | 3.20 | 1.58313 | 59.4 | 0.54230 |
| 16 | −51.755 | 3.31 | | | |
| 17 | 54.205 | 0.80 | 1.76182 | 26.5 | 0.61353 |
| 18 | 8.790 | 0.50 | | | |
| 19 | 17.094 | 0.70 | 2.00800 | 10.2 | 0.58820 |
| 20 | 12.677 | 2.70 | 1.69895 | 30.1 | 0.60291 |
| 21 | −49.030 | Variable | | | |
| 22 | −32.233 | 0.70 | 1.51633 | 64.1 | 0.53524 |
| 23 | −104.135 | Variable | | | |
| 24* | 17.882 | 2.50 | 1.58313 | 59.4 | 0.54230 |
| 25 | −116.206 | Variable | | | |
| 26 | ∞ | 1.00 | 1.51633 | 64.1 | 0.53524 |
| 27 | ∞ | 2.00 | | | |
| Image plane | ∞ | | | | |

Aspheric Coefficients

| r15 | κ = −5.07030e−001 | A4 = −5.55503e−005 |
|---|---|---|
| | A6 = 2.81063e−007 | A8 = −5.68817e−008 |
| | A10 = 2.12024e−009 | |
| r24 | κ = 4.82475e−001 | A4 = −2.45796e−005 |
| | A6 = 2.23972e−007 | A8 = −3.98282e−009 |

Various Data
Zoom Ratio 19.76

| | Wide-angle end | Middle Focal Length | Telephoto end |
|---|---|---|---|
| Focal Length | 4.95 | 17.10 | 97.86 |
| F-number | 2.85 | 3.42 | 5.68 |
| Angle of View | 38.04 | 12.76 | 2.27 |
| Image Height | 3.88 | 3.88 | 3.88 |
| Lens Total Length | 86.04 | 91.45 | 118.04 |
| BF | 10.05 | 15.93 | 8.58 |
| d5 | 0.70 | 22.07 | 41.23 |
| d13 | 26.08 | 8.15 | 1.85 |
| d14 | 7.79 | 3.75 | 1.10 |
| d21 | 1.55 | 0.87 | 4.93 |
| d23 | 2.01 | 2.84 | 22.51 |
| d25 | 7.39 | 13.27 | 5.92 |

Various Data of Each Unit

| Lens unit | First surface | Focal length |
|---|---|---|
| 1 | 1 | 62.98 |
| 2 | 6 | −9.60 |
| 3 | 14 | ∞ |
| 4 | 15 | 18.68 |

-continued

Unit: mm

| | | |
|---|---|---|
| 5 | 22 | −90.71 |
| 6 | 24 | 26.76 |
| 7 | 26 | ∞ |

TABLE 1

| Condition | | Numerical Example | | | | |
|---|---|---|---|---|---|---|
| | | 1 | 2 | 3 | 4 | |
| | fW | 4.256 | 3.623 | 6.479 | 4.952 | |
| | fT | 62.983 | 72.393 | 74.824 | 97.865 | |
| (2) | vd3n | 26.8 | 23.5 | 17.2 | 26.5 | 10.2 |
| (1) | θgF3n | 0.5800 | 0.5956 | 0.6082 | 0.6135 | 0.5882 |
| | f3n | −13.551 | −18.946 | −20.337 | −13.878 | −52.9 |
| | f3 | 16.887 | 17.644 | 27.637 | 18.681 | |
| | f2 | −5.789 | −5.446 | −10.478 | −9.600 | |
| | f1 | 30.886 | 31.489 | 44.371 | 62.985 | |
| | FnoT | 3.090 | 3.500 | 3.500 | 5.675 | |
| (7) | Nd3n | 1.84666 | 1.84660 | 2.10500 | 1.76182 | 2.0080 |
| (3) | \|f3n\|/f3 | 0.802 | 1.074 | 0.736 | 0.743 | 2.831 |
| (4) | fT/\|f2\| | 10.879 | 13.292 | 7.141 | 10.194 | |
| (5) | f3/fT | 0.268 | 0.244 | 0.369 | 0.191 | |
| (6) | (fT/fW)/FnoT | 4.789 | 5.709 | 3.300 | 3.482 | |
| (8) | f1/\|f2\| | 5.335 | 5.782 | 4.235 | 6.561 | |
| | t3n | 0.60 | 0.70 | 0.70 | 0.80 | 0.50 |
| | t1min | 1.15 | 1.20 | 1.50 | 1.80 | 1.80 |
| (9) | t1min/t3n | 1.92 | 1.71 | 2.14 | 2.25 | 3.6 |
| | Hk3n | 420 | 400 | 375 | 400 | 360 |
| | Hk1min | 520 | 520 | 350 | 350 | 350 |
| (10) | Hk3n/Hk1min | 0.81 | 0.77 | 1.07 | 1.14 | 1.03 |

One of the aspects of the disclosure is directed to a positive-lead type zoom lens having a high zoom ratio, which is capable of achieving a high optical performance for the entire zooming range by appropriately correcting chromatic aberration at the telephoto end, and to an image pickup apparatus having the zoom lens. While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-095808 filed Apr. 19, 2010, which is hereby incorporated by reference herein in its entirety.

What is claimed is:

1. A zoom lens comprising, in order from an object side to an image side:

a first lens unit having a positive refractive power;

a second lens unit having a negative refractive power;

a third lens unit having a positive refractive power; and a rear lens unit including one or more lens units, wherein, during zooming, an interval between respective adjacent lens units varies such that an interval between the first lens unit and the second lens unit is larger at a telephoto end than at a wide-angle end and an interval between the second lens unit and the third lens unit is smaller at the telephoto end than at the wide-angle end, wherein the third lens unit includes at least one negative lens, and wherein, when $vd3n$ and $\theta gF3n$ are respectively an Abbe number and a relative partial dispersion of a material of the at least one negative lens of the third lens unit, the following conditions are satisfied:

$(-1.68 \times 10^{-3} \times vd3n + 0.570) < \theta gF3n < (3.15 \times 10^{-4} \times vd3n^2 - 1.86 \times 10^{-2} \times vd3n + 0.878)$, $5 < vd3n < 27$.

2. The zoom lens according to claim 1, wherein, when $f3n$ is a focal length of the at least one negative lens of the third lens unit and $f3$ is a focal length of the third lens unit, the following condition is satisfied:

$0.5 < |f3n|/f3 < 6.0$.

3. The zoom lens according to claim 1, wherein when $fT$ is a focal length of the entire zoom lens at the telephoto end and $f2$ is a focal length of the second lens unit, the following condition is satisfied:

$5.0 < fT/|f2| < 25.0$.

4. The zoom lens according to claim 1, wherein $fT$ is a focal length of the entire zoom lens at the telephoto end and $f3$ is a focal length of the third lens unit, the following condition is satisfied:

$0.1 < f3/fT < 6.0$.

5. The zoom lens according to claim 1, wherein, when $fW$ and $fT$ are respectively focal lengths of the entire zoom lens at the wide-angle end and at the telephoto end and $FnoT$ is an F-number at the telephoto end, the following condition is satisfied:

$3.2 < (fT/fW)/FnoT < 15$.

6. The zoom lens according to claim 1, wherein, when $Nd3n$ is a refractive index of the material of the at least one negative lens of the third lens unit, the following condition is satisfied:

$1.84 < Nd3n < 2.50$.

7. The zoom lens according to claim 1, wherein, when $f1$ and $f2$ are respectively focal lengths of the first lens unit and the second lens unit, the following condition is satisfied:

$3.0 < f1/|f2| < 10.0$.

8. The zoom lens according to claim 1, wherein, when $t3n$ is a thickness of the at least one negative lens of the third lens unit on an optical axis and $t1min$ is a thickness of a lens having a smallest thickness value on the optical axis among lenses included in the first lens unit, the following condition is satisfied:

$$0.8 < t1\min/t3n < 5.0.$$

9. The zoom lens according to claim 1, wherein the rear lens unit has an overall positive refractive power for an entire zooming range.

10. The zoom lens according to claim 1, wherein the rear lens unit consists of a fourth lens unit having a positive refractive power.

11. The zoom lens according to claim 1, wherein the rear lens unit consists of a fourth lens unit having a negative refractive power and a fifth lens unit having a positive refractive power.

12. An image pickup apparatus comprising:
   the zoom lens according to claim 1; and
   an image sensor configured to receive an image formed by the zoom lens.

* * * * *